United States Patent
Morimoto et al.

(10) Patent No.: US 7,790,329 B2
(45) Date of Patent: *Sep. 7, 2010

(54) POLYMER ELECTROLYTE FUEL CELL AND MANUFACTURING METHOD FOR ELECTRODE-MEMBRANE-FRAME ASSEMBLY

(75) Inventors: Takashi Morimoto, Osaka (JP); Hiroki Kusakabe, Osaka (JP); Toshihiro Matsumoto, Osaka (JP); Norihiko Kawabata, Osaka (JP); Atsushi Murata, Shiga (JP)

(73) Assignee: Pansonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/469,995

(22) Filed: May 21, 2009

(65) Prior Publication Data

US 2009/0226782 A1    Sep. 10, 2009

Related U.S. Application Data

(63) Continuation of application No. 12/306,986, filed as application No. PCT/JP2008/000758 on Mar. 27, 2008.

(30) Foreign Application Priority Data

Mar. 30, 2007    (JP)    ............................. 2007-091975

(51) Int. Cl.
*H01M 8/10* (2006.01)
*H01M 8/04* (2006.01)
*H01M 8/02* (2006.01)

(52) U.S. Cl. ...................... 429/483; 429/479; 429/428; 429/436; 429/437; 429/26

(58) Field of Classification Search ...................... None
See application file for complete search history.

(56) References Cited

U.S. PATENT DOCUMENTS 6,610,435 B1    8/2003    Maruyama et al.

(Continued)

FOREIGN PATENT DOCUMENTS

EP    1 876 666 A1    1/2008

(Continued)

OTHER PUBLICATIONS

JPO IPDL machine translation of JP2007018957, published Jan. 25, 2007, retrieved Nov. 4, 2009.*

(Continued)

*Primary Examiner*—Dah-Wei D Yuan
*Assistant Examiner*—Katherine Turner
(74) *Attorney, Agent, or Firm*—Wenderoth, Lind & Ponack, L.L.P.

(57) ABSTRACT

A MEA-frame assembly is arranged in a mold for injection molding to form a first flow passage arranged so as to extend along the outer periphery of an electrode between the outer periphery of the electrode and the inner periphery of a frame, a second flow passage arranged so as to extend along an inner elastic member between the inner periphery and outer periphery of the frame and a plurality of connecting flow passages which communicate the first flow passage with the second flow passage. An elastic resin is injected into the first flow passage to fill the first flow passage with the elastic resin and to fill the second flow passage with the elastic resin through each of the communicating flow passages, thereby an elastic member which hermetically seals the space between the MEA-frame assembly and the separator is integrally formed.

3 Claims, 18 Drawing Sheets

U.S. PATENT DOCUMENTS

| | | | |
|---|---|---|---|
| 6,805,986 B2* | 10/2004 | Kuroki | 429/22 |
| 2003/0143447 A1* | 7/2003 | Akimoto et al. | 429/23 |
| 2003/0219638 A1* | 11/2003 | Tanaka et al. | 429/26 |
| 2004/0209148 A1 | 10/2004 | Ohara et al. | |
| 2004/0234831 A1 | 11/2004 | Kobayashi et al. | |
| 2005/0084734 A1 | 4/2005 | Kobayashi et al. | |
| 2005/0142414 A1 | 6/2005 | Kimura et al. | |
| 2006/0127744 A1 | 6/2006 | Yamaga et al. | |
| 2007/0212587 A1 | 9/2007 | Fragiadakis et al. | |
| 2009/0136811 A1 | 5/2009 | Kusakabe et al. | |
| 2009/0286121 A1 | 11/2009 | Morimoto et al. | |

FOREIGN PATENT DOCUMENTS

| | | | |
|---|---|---|---|
| JP | 2001-102072 | | 4/2001 |
| JP | 2003-323900 | | 11/2003 |
| JP | 2004-303723 | | 10/2004 |
| JP | 2004-311254 | | 11/2004 |
| JP | 2004-319461 | | 11/2004 |
| JP | 2005-100970 | | 4/2005 |
| JP | 2005-259465 | | 9/2005 |
| JP | 2006-172752 | | 6/2006 |
| JP | 2006-310288 | | 11/2006 |
| JP | 2007018957 | * | 1/2007 |
| JP | 2008-010350 | | 1/2008 |
| WO | 2006/102734 | | 10/2006 |
| WO | 2006/106908 | | 10/2006 |
| WO | 2008/001755 | | 1/2008 |

OTHER PUBLICATIONS

International Search Report issued Jul. 15, 2008 in the International (PCT) Application of which the present application is the U.S. National Stage.

JPO IPDL machine translation of JP 2006-310288, published Nov. 9, 2006.

JPO IPDL machine translation of JP 2006-310288 (including claims), published Nov. 9, 2006.

Supplementary European Search Report issued Aug. 10, 2009 in counterpart European Application No. 08720637.

Office Action dated Nov. 9, 2009 in U.S. Appl. No. 12/469,977.

KIPO machine translation of KR1020080084917, published Sep. 22, 2008.

Office Action dated Oct. 8, 2009 in parent U.S. Appl. No. 12/306,986.

International Preliminary Report on Patentability including English Translation of PCT Written Opinion dated Oct. 15, 2009 in the International (PCT) Application PCT/JP2008/000758 of which the present application is the U.S. National Stage.

* cited by examiner

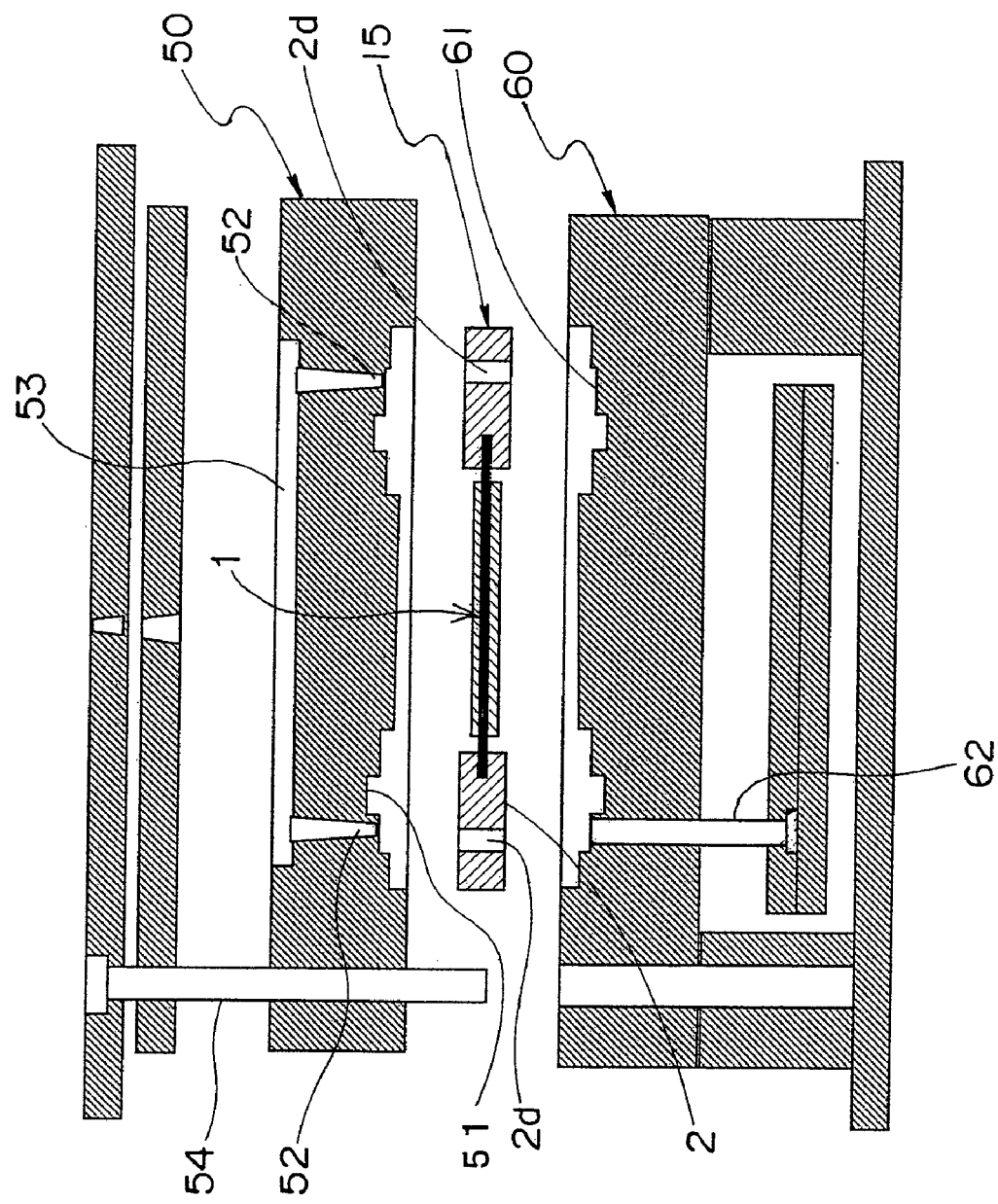

Prior Art

POLYMER ELECTROLYTE FUEL CELL AND MANUFACTURING METHOD FOR ELECTRODE-MEMBRANE-FRAME ASSEMBLY

This application is a continuation application of application Ser. No. 12/306,986 filed on Dec. 30, 2008, which is the U.S. national stage of International Application PCT/JP2008/000758, filed Mar. 27, 2008.

BACKGROUND OF THE INVENTION

I. Technical Field

The present invention relates to a solid polymer electrolyte fuel cell, and particularly, to an improvement in the seal structure between an electrolyte membrane electrode assembly and electroconductive separator of a fuel cell.

II. Description of the Related Art

In conventional solid polymer electrolyte fuel cells, a single cell module is used which is constituted by sandwiching a MEA-frame assembly in which a membrane electrode assembly (MEA) is supported by a frame provided with a gasket arranged around its periphery for sealing gas between an anode side electroconductive separator plate and a cathode side electroconductive separator plate. The MEA is constituted of a polymer electrolyte membrane, and an anode bound to one side of this polymer electrolyte membrane and a cathode bound to other side of the polymer electrolyte membrane. Gas supply sections are formed on the periphery of each separator plate to supply fuel gas to the anode and oxidizer gas to the cathode of the MEA, respectively.

However, this conventional solid polymer electrolyte fuel cell, as shown by a sectional view of an electrode-membrane-frame assembly in FIG. 15, gives rise to the occurrence of the so-called cross-leak phenomenon in which a part of the gas supplied to the inside of the battery is discharged through this clearance 303 because a clearance 303 is present between the inside periphery of a frame 300 and an electrode (MEA) 302 with respect to necessity of the assembly of the frame 300 and a separator 301.

Further, for improving this phenomenon, there are a proposal of a structure in which, as shown by a sectional view of an electrode-membrane-frame assembly in FIG. 16, a second gasket 308 is arranged in this clearance 303 and a proposal of a method in which a part of the inside periphery of the gasket is placed to be partially in contact with the outside periphery of the electrode 302 (not shown, see for example, JP-A No. 2005-100970).

Further, the MEA, namely, the polymer electrolyte membrane is incorporated into almost the center of the thickness of the frame and as a binding method thereof, a thermal pressure bonding method, method using an adhesive and a method using a mechanical cramp are adopted.

Further, as a structure of arrangement of the gasket and the like in the electrode-membrane-frame assembly, other various structures are proposed (see, for example, JP-A No. 2006-172752, JP-A No. 2006-310288, JP-A No. 2001-102072, JP-A No. 2005-259465, U.S. Pat. No. 6,610,435 and U.S. Pat. Laid-Open No. 2005/0142414).

SUMMARY OF THE INVENTION

However, the binding method using thermal pressure bonding or adhesives of the polymer electrolyte membrane has the possibility of bringing about deterioration in the performance of the polymer electrolyte membrane caused by heat and the volatile components of the adhesives and is therefore limited in its condition. Further, the binding method using a mechanical cramp gives rise to the problem that the cross-leak from a fine clearance between the polymer electrolyte membrane and the frame easily occurs.

In the structure of the electrode-membrane-frame assembly as shown in FIG. 16, since the structure is adopted in which the second gasket 308 is arranged which prevents the clearance 303 from being created between the inside periphery of the frame 300 and the electrode 302, there is a problem that this method requires a high production cost. Furthermore, this method has the problem of difficult dimensional control when filling the clearance by partially melting this gasket 308.

Further, in the structure of the electrode-membrane-frame assembly of JP-A No. 2005-100970, a part of the inside periphery of the gasket is in partly contact with the outside periphery of the electrode 302 and therefore, the effect of suppressing the cross-leak phenomenon is insufficient. Further, the gas diffusion electrode has the problem that the electrode is easily damaged in the fabrication because the major component of the gas diffusion electrode is usually fragile carbon fibers.

Furthermore, none of JP-A No. 2006-172752, JP-A No. 2006-310288, JP-A No. 2001-102072, JP-A No. 2005-259465, U.S. Pat. No. 6,610,435 and U.S. Pat. Laid-Open No. 2005/0142414 discloses such an electrode-membrane-frame assembly that improves each utilization ratio of reductant gas and oxidizer gas while efficiently suppressing the occurrence of the cross-leak phenomenon.

Accordingly, it is an object of the present invention to solve the above problem and to provide a polymer electrolyte fuel cell which can efficiently suppress the occurrence of the cross-leak phenomenon in which gas leaks through the clearance between the polymer electrolyte membrane and therefore, can more improve the rate of utilization ratio of each of the reductant gas and the oxidizer gas and can be more improved in performance of the polymer electrolyte fuel cell, and to provide a manufacturing method for electrode-membrane-frame assembly to be used in such a polymer electrolyte fuel cell.

In order to achieve the above object, the present invention is constructed as follows.

According to a first aspect of the present invention, there is provided a polymer electrolyte fuel cell assembled by stacking a plurality of single cell modules each comprising an electrode-membrane-frame assembly which is formed of a membrane electrode assembly constituted by binding an anode electrode to one surface of a polymer electrolyte membrane and binding a cathode electrode to the other surface of the polymer electrode membrane in such a manner that the periphery of the polymer electrolyte membrane is exposed, and a frame which contains a gas supply section that supplies fuel gas and oxidizer gas to the anode electrode and the cathode electrode respectively and which sandwiches the periphery of the electrolyte membrane to support the membrane electrode assembly; and a pair of separators which sandwich the electrode-membrane-frame assembly from the anode side and the cathode side, the electrode-membrane-frame assembly comprising;

an inner elastic member which is arranged on the electrolyte membrane so as to extend along the outer periphery of the electrode between the outer periphery of the anode electrode or cathode electrode and the inner periphery of the frame, the inner elastic member being bound to the frame;

an outer elastic member which is arranged so as to extend along the inner elastic member between the outer periphery and inner periphery of the frame, the outer elastic member being bound to the frame; and a plurality of connecting elastic members which connect the inner elastic member with the outer elastic member, the connecting elastic members being bound to the frame, wherein the inner elastic member and the outer elastic member respectively have a thickness higher than a dimension of an interval between the electrode-membrane-frame assembly and the separator after the single cell module is assembled and in the condition where the single cell module is assembled, each of the elastic members is elastically deformed in a direction of a thickness of the electrode-membrane-frame assembly to hermetically seal the space between the electrode-membrane-frame assembly and the separator.

According to a second aspect of the present invention, there is provided the polymer electrolyte fuel cell as defined in the first aspect, wherein the inner elastic member is formed over the entire periphery of the anode electrode or the cathode electrode except for the formation position of a gas passage used to supply gas to the anode electrode or the cathode electrode from the gas supply section of the frame in the electrode-membrane-frame assembly.

According to a third aspect of the present invention, there is provided the polymer electrolyte fuel cell as defined in the first aspect, wherein the outer elastic member is formed such that its top is higher than that of the inner elastic member and the outer elastic member functions as a gasket which hermetically seals the space between the membrane-electrode assembly and the separator out of the single cell module.

According to a fourth aspect of the present invention, there is provided the polymer electrolyte fuel cell as defined in the first aspect, wherein the inner elastic member, the outer elastic member and the connecting elastic member are each formed on the front side and the backside of the electrode-membrane-frame assembly.

According to a fifth aspect of the present invention, there is provided the polymer electrolyte fuel cell as defined in the first aspect, wherein the inner elastic member, the outer elastic member and the connecting elastic members are each formed as an assembly by injection molding and an injection gate trace elastic member formed at a resin injection gate in injection molding is connected only to said outer elastic member among said elastic members.

According to a sixth aspect of the present invention, there is provided the polymer electrolyte fuel cell as defined in the fifth aspect, wherein the inner elastic member, the outer elastic member and the connecting elastic member are each formed on a front side or a backside of the electrode-membrane-frame assembly;

the outer elastic member on the surface side and the outer elastic member on the backside among the elastic members are connected by the injection gate trace elastic member; and a through-hole with said injection gate trace elastic member formed inside thereof is formed in said frame.

According to a seventh aspect of the present invention, there is provided a manufacturing method for an electrode-membrane-frame assembly in a polymer electrolyte fuel cell assembled by stacking a plurality of single cell modules each comprising an electrode-membrane-frame assembly which is formed of a membrane-electrode assembly constituted by binding an anode electrode to one surface of a polymer electrolyte membrane and binding a cathode electrode to the other surface of the polymer electrolyte membrane in such a manner that the periphery of the polymer electrolyte membrane is exposed, and a frame which contains a gas supply section that supplies fuel gas and oxidizer gas to the anode electrode and the cathode electrode respectively and which sandwiches the periphery of the electrolyte membrane to support the membrane-electrode assembly; and a pair of separators which sandwich the electrode-membrane-frame assembly from the anode side and the cathode side, the method comprising:

arranging the electrode-membrane-frame assembly in a mold for injection molding to form a first flow passage arranged on the electrolyte membrane so as to extend along the outer periphery of the electrode between the outer periphery of the anode electrode or the cathode electrode and the inner periphery of the frame, a second flow passage arranged so as to extend along the inner elastic member between the inner periphery and outer periphery of the frame and a plurality of connecting flow passages which communicate the first flow passage with the second flow passage in the electrode-membrane-frame assembly;

injecting an elastic resin into the first flow passage to fill the first flow passage with the elastic resin and to also fill the second flow passage with the elastic resin through each of the communicating flow passages; and curing the filled elastic resin, thereby integrating an elastic member which is elastically deformed in a thickness direction of the electrode-membrane-frame assembly in each of the first and second flow passages and in each of the communicating flow passages in the state of being assembled the single cell module to hermetically seal the space between the electrode-membrane-frame assembly and the separator.

According to an eighth aspect of the present invention, there is provided the manufacturing method for the electrode-membrane-frame assembly as defined in the seventh aspect, wherein the first flow passage is formed over the entire periphery of the anode electrode or the cathode electrode except for the formation position of a gas passage used to supply gas to the anode electrode or the cathode electrode from the gas supply section of the frame in the electrode-membrane-frame assembly.

According to a ninth aspect of the present invention, there is provided the manufacturing method for the electrode-membrane-frame assembly as defined in the seventh aspect, wherein the first and second flow passages have a depth higher than the dimension of the interval between the electrode-membrane-frame assembly and the separator in the state of being assembled the single cell module.

According to a tenth aspect of the present invention, there is provided the manufacturing method for the electrode-membrane-frame assembly as defined in the seventh aspect, wherein, in the formation of the flow passages, each of the communicating passages is formed so as to have a larger sectional area than the others with an increase in the distance from the position at which the elastic resin is injected in the first flow passage.

According to an eleventh aspect of the present invention, there is provided the manufacturing method for the electrode-membrane-frame assembly as defined in the seventh aspect, wherein, in the formation of the flow passages, the first and second flow passages and each of the communicating flow passages are formed on the anode side and cathode side surfaces of the electrode-membrane-frame assembly, and the elastic resin is simultaneously filled in the first flow passage of the anode side and the first flow passage of the cathode side through a through-hole of the frame.

According to a twelfth aspect of the present invention, there is provided the manufacturing method for the electrode-membrane-frame assembly as defined in the seventh aspect, wherein, in the formation of the flow passages, each of the flow passage is formed such that the sectional area of each of the connecting flow passages is smaller than that of the first flow passage and that of second flow passage.

According to a thirteenth aspect of the present invention, there is provided the manufacturing method for the electrode-membrane-frame assembly as defined in the seventh aspect, wherein, in the formation of the flow passages, the top of the first passage is higher than that of the second passage.

According to the present invention, the electrode-membrane-frame assembly is provided with an anode side inner elastic member having, for example, a horizontally frame shape and a cathode side inner elastic member having a horizontally frame shape on the inner periphery of the frame supporting the polymer electrolyte membrane and the like. With this structure, a seal effect can be produced by elastically deforming the anode side inner elastic member between the frame and the anode side separator to bring the elastic member into hermetically contact with the frame and the anode side separator to seal when a unit cell is fabricated. Further, in the same as in the cathode side, a seal effect can be produced by elastically deforming the cathode side inner elastic member between the frame and the cathode side separator to bring the elastic member into hermetically contact with the frame and the cathode side separator to seal when a unit cell is fabricated.

As a result, the cross-leak phenomenon in which gas leaks through the clearance between the polymer electrolyte membrane and the frame can be efficiently suppressed, and each of a short-cut flow of the reductant gas along the periphery of the frame and the short-cut flow of the oxidizer gas along the periphery of the frame can be suppressed. As a result, each utilization ratio of the reductant gas and the oxidizer gas can be more enhanced to thereby more improve the performance of the polymer electrolyte fuel cell.

Moreover, the outer elastic member is arranged along the outer peripheral side of this inner elastic member and at the same time, a plurality of connecting elastic members connecting the inner elastic member with the outer elastic member are formed, thereby making it possible to form the inner elastic member without fail while preventing thermal damages to the electrode portion or the like even by the resin pressure uniformed by injection molding. Specifically, after a resin is injected into a first flow passage corresponding to the outer elastic member to decrease a variation in resin pressure, the resin is introduced into and filled in a second flow passage corresponding to the inner elastic member through a communicating flow passage corresponding to the connecting elastic member, whereby the resin pressure in the second flow passage can be uniformed. Therefore, the resin made to be locally put into a high-pressure and high-temperature state can be prevented from flowing into the second flow passage which is in contact with the electrode portion or the like, and then the inner elastic member can be formed without fail.

BRIEF DESCRIPTION OF THE DRAWINGS

These aspects and features of the present invention will become clear from the following description taken in conjunction with the preferred embodiments thereof with reference to the accompanying drawings, in which:

FIG. 6A is a schematic view showing the procedures for forming an elastic member of the MEA-frame assembly of the first embodiment by injection molding.

DETAILED DESCRIPTION OF THE INVENTION

Figure 1:
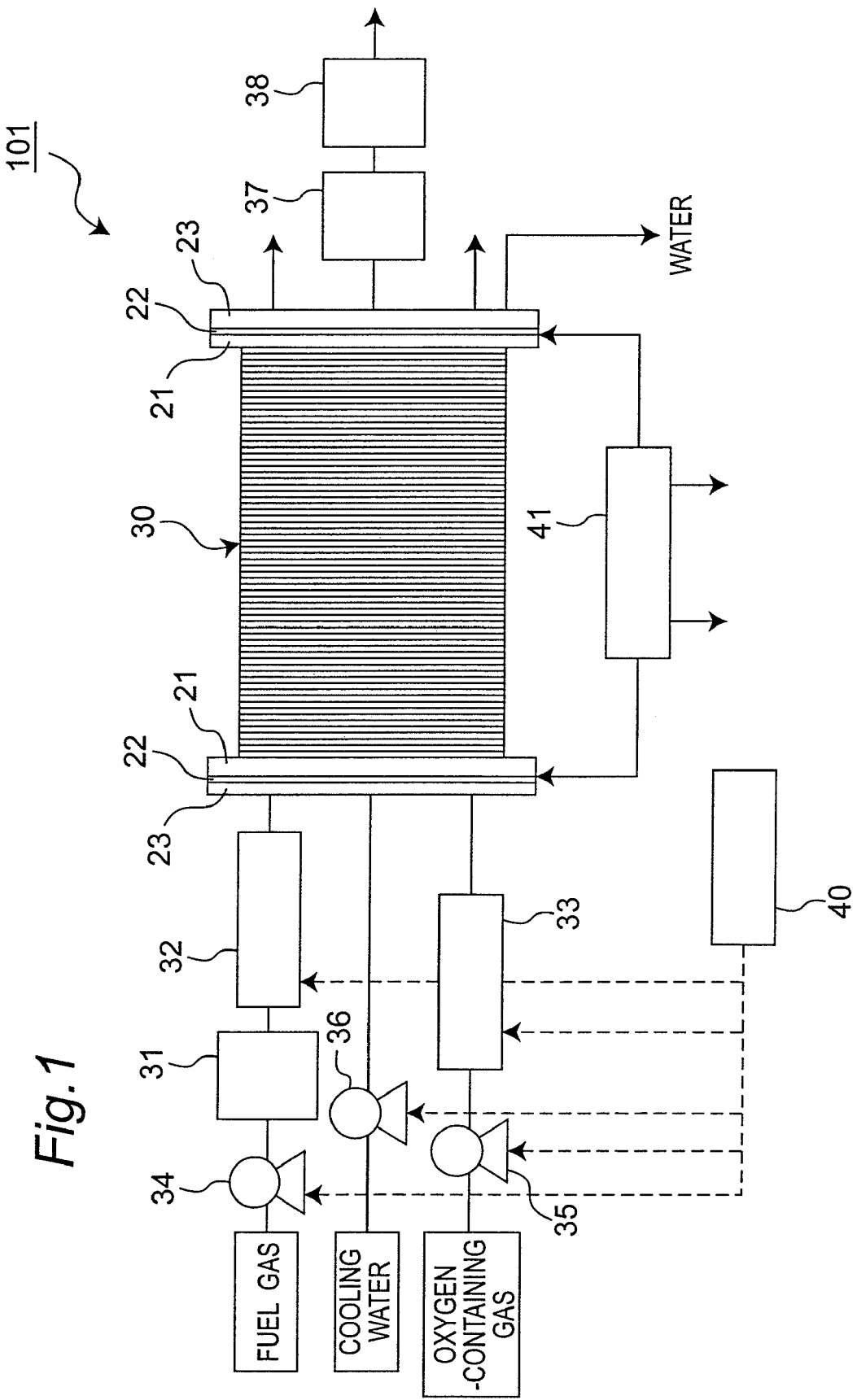
FIG. 1 is a schematic structural view showing the schematic structure of a fuel cell provided with a fuel cell stack according to a first embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

First Embodiment

FIG. 1 is a schematic structural view showing the schematic structure of a fuel cell provided with a fuel cell stack according to a first embodiment of the present invention. Further, FIG. 2 is a schematic exploded view of the fuel cell stack (hereinafter referred to as "stack") with which a fuel cell 101 shown in FIG. 1 is provided.

The fuel cell 101 is, for example, a solid polymer electrolyte fuel cell (PEFC) that generates power, heat and water at the same time by electrochemically reacting fuel gas containing hydrogen with oxidizer gas containing oxygen such as air. As shown in FIG. 1, the fuel cell 101 is provided with a stack 30 having a stacked structure in which a plurality of fuel cells (or unit cells) provided with a pair of anode and cathode are connected in series, a fuel treating unit 31 which extracts hydrogen from fuel gas, an anode humidifier 32 which humidifies the fuel gas containing hydrogen extracted in the fuel treating unit 31 to thereby improve power generation efficiency, a cathode humidifier 33 which humidifies oxygen-containing gas (oxidizer gas) and pumps 34 and 35 that supply the fuel gas and the oxygen-containing gas, respectively. Specifically, the fuel treating unit 31, the anode humidifier 32 and the pump 34 constitutes a fuel supply unit that supplies the fuel gas to each cell of the gas stack 30. Further, the cathode humidifier 33 and the pump 35 constitute an oxidizer supply unit that supplies the oxidizer gas to each cell of the stack 30. Here, as such a fuel supply unit and an oxidizer supply unit, other various structures may be adopted insofar as they have the ability to supply the fuel and oxidizer. In this first embodiment, any supply unit can obtain the effect of the first embodiment which will be described later as long as it is a supply unit that supplies the fuel and oxidizer to a plurality of cells with which the stack 30 is provided in common.

Further, the fuel cell 101 is provided with a pump 36 that supplies cooling water to be circulated for efficiently removing the heat generated in the stack 30 when power is generated, a heat exchanger 37 that exchanges the heat removed by this cooling water (for example, a liquid having no electro-conductivity such as pure water is used) with a fluid such as city water and a warm-water tank 38 that reserves the heat-exchanged top water. Furthermore, the fuel cell 101 is provided with an operation control device 40 that performs a control operation for power generation by correlating the operation with each structural section and a power output section 41 that draws the power generated by the stack 30.

Figure 2:
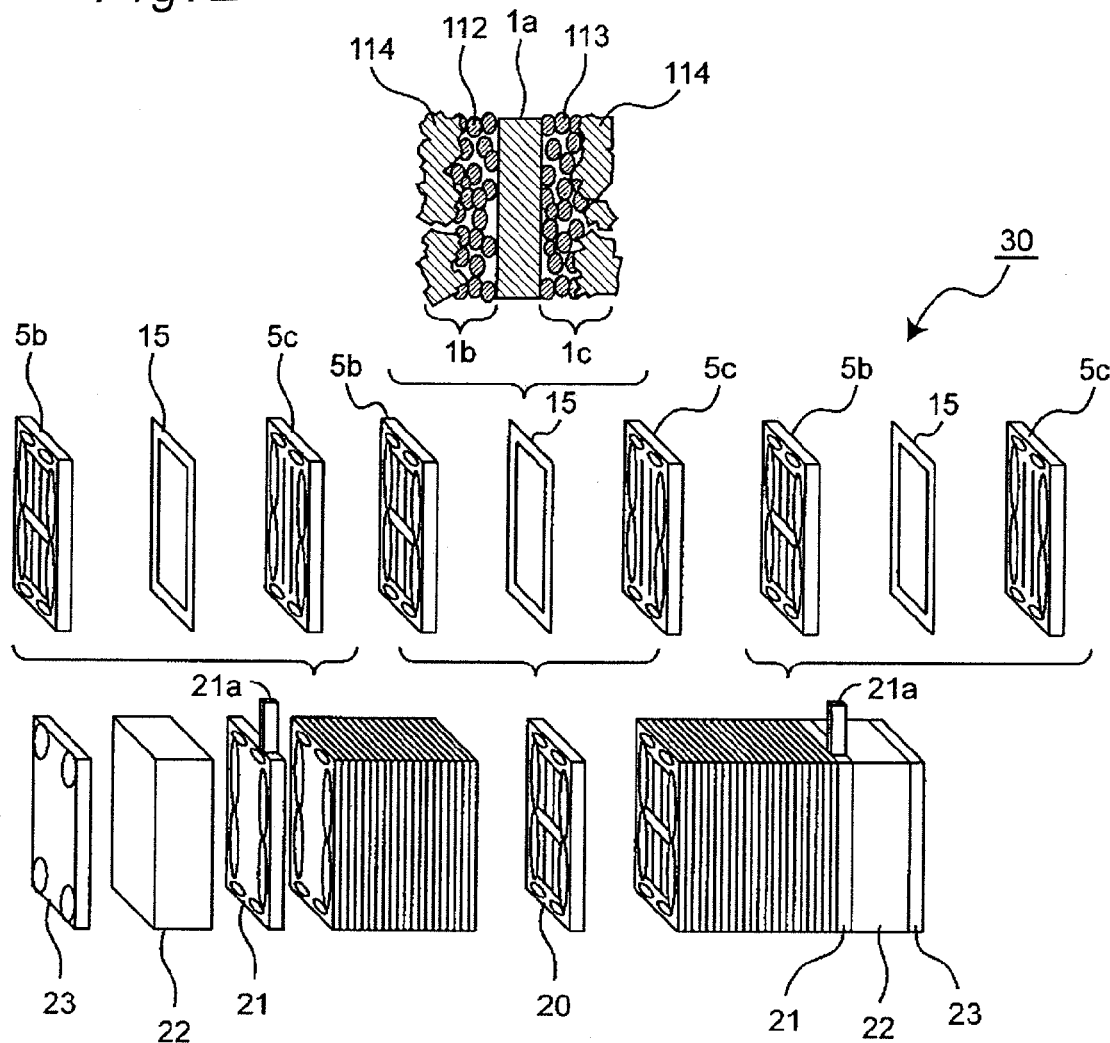
FIG. 2 is a schematic exploded view of the fuel cell stack with which the fuel cell shown in FIG. 1 is provided.

Further, as shown in FIG. 2, the stack 30 mounted on this fuel cell 101 is constituted by stacking a plurality of single cells (single cell module) 20 which are basic unit structures and by fastening the stacked cells with a current collecting plate 21, an insulating plate 22 and an end plate 23 from both sides under a prescribed load. Each of the current collecting plates 21 is provided with a current drawing terminal part 21a, from which current, that is, power is drawn when the power is generated. Each insulating plate 22 insulates the current collecting plate 21 from the end plate 23. Further, these insulating plates 22 may also be provided with introduction and discharge ports for gas and cooling-water, though not shown, depending on the case. Each end plate 23 fastens and supports the a plurality of stacked single cells 20, the current collecting plate 21 and the insulating plate 22 under a prescribed load by a pressure means (though not shown).

As shown in FIG. 2, the single cell 20 is structured in such a manner that an electrode-membrane-frame assembly (hereinafter referred to as "MEA-frame assembly") in which a MEA (membrane-electrode assembly) 1 is supported by a frame is sandwiched between a pair of separators 5b and 5c.

MEA 1 is structured by forming a catalyst layer (anode side catalyst layer) 112 containing, as its major component, a carbon powder carrying a platinum-ruthenium alloy catalyst on the anode surface side of a polymer electrolyte membrane 1a that selectively transfers hydrogen ions and a catalyst layer (cathode side catalyst layer) 113 containing, as its major component, a carbon powder carrying a platinum catalyst on the cathode surface side and by arranging a gas diffusion layer 114 having both fuel gas or oxidizer gas permeability and electron conductivity on the outside surfaces of these catalyst layers 112 and 113. As the polymer electrolyte membrane 1a, a solid polymer material exhibiting proton conductivity, for example, a perfluorosulfonic acid membrane (Nafion membrane, manufactured by Du Pont) is generally used. Here, hereinafter, the anode side catalyst layer 112 and the gas diffusion layer 114 are collectively called "anode electrode 1b" and the cathode side catalyst layer 113 and the gas diffusion layer 114 are collectively called "cathode electrode 1c".

Each of the separators 5b and 5c may be made of a gas-impermeable electroconductive material and for example, those obtained by cutting a carbon material impregnated with a resin into a specified shape or those obtained by molding mixtures of a carbon powder and a resin material are usually used. A concave groove is formed on the parts of the separators 5b and 5c which are in contact with the MEA-frame assembly 15. When this groove is brought into contact with the gas diffusion layer 114, a gas flow passage is formed which serves to supply fuel gas or oxidizer gas to the electrode surfaces of the anode electrode 1b and the cathode electrode 1c and to convey excess gas. As the base material of the gas diffusion layer 114, a material formed of carbon fibers is usually used. As such a base material, for example, a carbon fiber woven fabric is used.

Figure 3A:
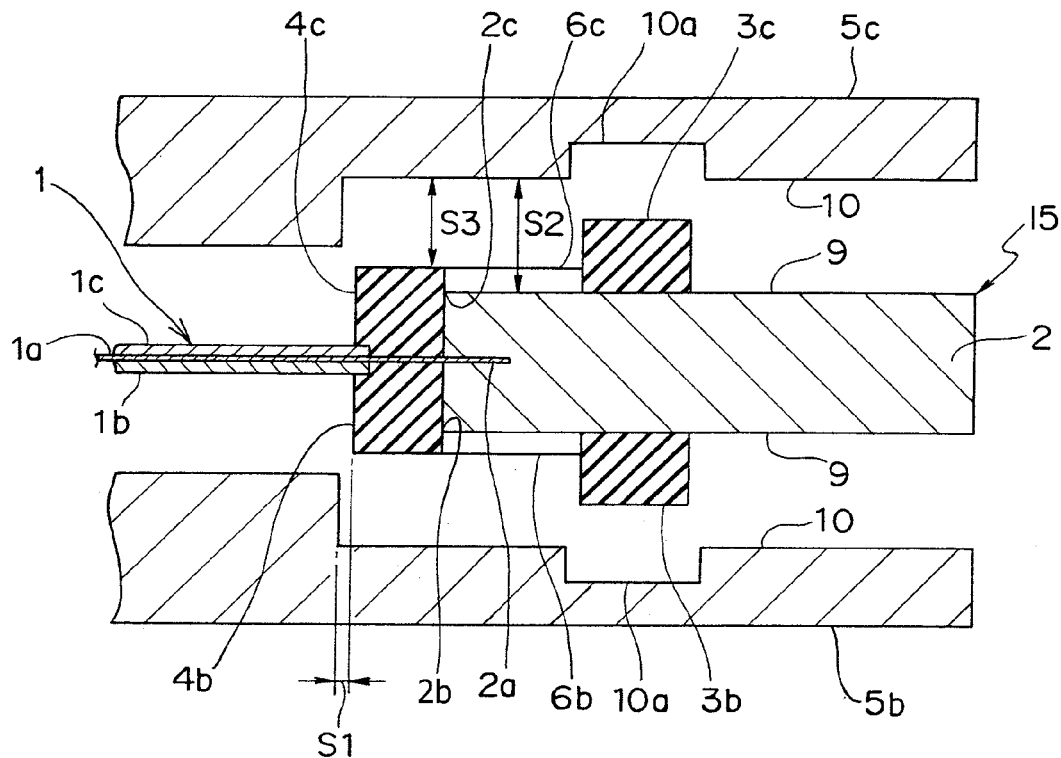
FIG. 3A is a schematic sectional view of a unit cell of the fuel cell stack before the unit cell is assembled.
Figure 3B:
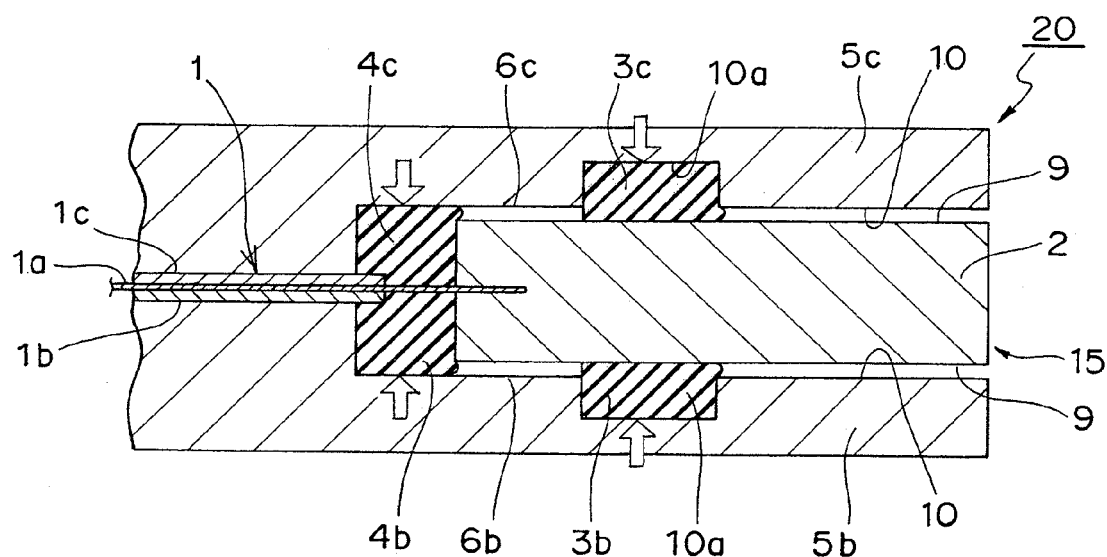
FIG. 3B is a schematic sectional view of a unit cell after the unit cell is assembled.

Here, an enlarged schematic partial sectional view of the vicinity (vicinity of the end part of the MEA-frame assembly) of the end part of the single cell 20 is shown in FIGS. 3A and 3B.

The single cell (single cell module) 20 is provided with the MEA-frame assembly 15 and the pair of separators 5b and 5c that sandwich the MEA-frame assembly 15 from the anode side and the cathode side. The MEA-frame assembly 15 is constituted of a MEA 1 formed by binding the anode electrode 1b to one surface of the polymer electrolyte membrane 1a and binding the cathode electrode 1c to the other surface of the electrolyte membrane 1a, and a frame 2 which is provided with gas supply sections 2x and 2y for supplying fuel gas and oxidizer gas to the anode electrode 1b and cathode electrode 1c respectively (see FIG. 14A) and supports the MEA 1 by sandwiching the peripheral part of this MEA 1. Then, a plurality of these single cells 20 are stacked to make an assembly, thereby forming a polymer electrolyte fuel cell.

In such a structure, for example, the polymer electrolyte membrane 1a is mechanically bound by inserting it into a polymer electrolyte membrane insertion slit 2a of the frame 2 to support it. Further, the anode electrode 1b and the cathode electrode 1c are attached and secured to both surfaces of the polymer electrolyte membrane 1a.

The anode electrode 1b and the cathode electrode 1c are attached and secured to both surfaces of the polymer electrolyte membrane 1a to form MEA (membrane-electrode assembly) 1 in this manner and the MEA-frame assembly 15 in which this MEA1 is sandwiched and supported by the frame 2 is sandwiched between the pair of separators 5b and 5c to form the single cell 20. In this single cell 20, the anode electrode side separator 5b is made to be facing the anode electrode 1b and the cathode electrode side separator 5c is made to be facing the cathode electrode 1c.

Next, a description will be given as to the structure of the elastic member formed in the MEA-frame assembly 15. In the MEA-frame assembly 15 which is not provided with this elastic body, clearances, for example, ranging from 0.1 mm to 10 mm exist between each of the outer periphery of the anode electrode 1b and outer periphery of the cathode electrode 1c, and each of the inner peripheries 2b and 2c of the frame 2 respectively in the situation where the single cell is fabricated. The MEA-frame assembly 15 is provided with elastic bodies formed for the purpose and function of filling the clearances formed along each of the electrodes 1b and 1c and of sealing the clearances between each of the separators 5b and 5c and the frame 2.

Specifically, as shown in FIG. 3A, an anode side inner elastic member 4b is arranged which is extended along the outer periphery of the anode electrode 1b so as to be in contact with both of the anode side inner periphery 2b of the frame 2 and the outer periphery of the anode electrode 1b and has a rectangular section. This anode side inner elastic member 4b is bound with the frame 2 and the anode electrode 1b to be integrated. Similarly, a cathode side inner elastic member 4c is disposed which is extended along the outer periphery of the cathode electrode 1c so as to be in contact with both of the cathode side inner periphery 2c of the frame 2 and the outer periphery of the cathode electrode 1c and has a rectangular section. This cathode side inner elastic member 4c is bound with the frame 2 and the cathode electrode 1c to be integrated. These inner elastic members 4b and 4c, in the situation as shown in FIG. 3A, are in the condition where they are arranged on and only in contact with the polymer electrolyte membrane 1a and there is no need to be adhered. Further, the clearances between each of the outer periphery of the anode electrode 1b and the outer periphery of the cathode electrode 1c and each of the inner peripheries 2b and 2c of the frame 2 are remarkably reduced by the inner elastic members 4b and 4c. For example, the inner elastic members 4b and 4c are formed such that clearances S1 between the inner peripheries of the inner elastic members 4b and 4c and each of the outer periphery of the anode electrode 1b and the outer periphery of the cathode electrode 1c slightly exist or become 0 (zero).

When the MEA-frame assembly 15 is arranged between the separators 5b and 5c in the situation where the inner elastic members 4b and 4c are formed in this manner to stack, thereby fabricating the single cell 20, the frame built-up surface 9 of the frame 2 is close to the built-up surface 10 of each of the separators 5b and 5c. At this time, each thickness of the inner elastic members 4b and 4c is so designed that a clearance S3 (see FIG. 3A) between the surfaces facing each other, that is, between the inner elastic member 4b and 4c and the separators 5b and 5c is smaller than a clearance S2 (see FIG. 3A) between the frame 2 and each of the separators 5b and 5c. When the inner elastic members 4b and 4c are structured in this manner, the inner elastic members 4b and 4c are brought into contact with the separators 5b and 5c respectively to start elastic deformation without fail before the frame built-up surface 9 of the frame 2 is placed at a position closest to each separator built-up surface 10 of the separators 5b and 5c (see FIG. 3B). Then, after completion of the fabrication, in other words, after the frame built-up surface 9 of the frame 2 is placed at a position closest to each separator built-up surface 10 of the separators 5b and 5c, the inner elastic members 4b and 4c are pressed by the separators 5b and 5c into an elastically deformed state, respectively, as shown in FIG. 3. As a result, the elastically deformed inner elastic members 4b and 4c serve to eliminate the clearance S1, so that the clearances existing between each of the outer periphery of the anode electrode 1b and the outer periphery of the cathode 1c and each of the inner peripheries 2b and 2c of the frame 2 respectively are put into such a state that they are completely filled with the inner elastic members 4b and 4c after these parts are fabricated.

Further, as shown in FIG. 3A, an anode side outer elastic member 3b and a cathode side outer elastic member 3c are arranged which are extended along the inner peripheries 2b and 2c of the frame 2 and have a rectangular section at a position apart in the outside direction from the inner elastic members 4b and 4c respectively on the frame built-up surface 9 of the frame 2. This anode side outer elastic member 3b is bound to the frame 2 to be integrated. Similarly, the cathode side outer elastic member 3c is also bound to the frame 2 to be integrated. Moreover, a concave part 10a is formed on the separator built-up surface 10 facing the position where each of the outer elastic members 3b and 3c are formed. The outer elastic members 3b and 3c are formed in such a manner as to have a higher rise than the inner elastic members 4b and 4c on the frame built-up surface 9. Specifically, each top (upper surface) of the outer elastic members 3b and 3c is formed such that it has a higher height than each top (upper surface) of the inner elastic bodies 4b and 4c. Moreover, each thickness of the outer elastic members 3b and 3c and the depth of the concave part 10a of the separator built-up surface 10 are so designed that the outer elastic members 3b and 3c are brought into contact with the bottom of the concave part 10a of each of the separators 5b and 5c without fail to start elastic deformation before the frame built-up surface 9 is placed at a position closest to the separator built-up surface 10. Then, after the frame built-up surface 9 is placed at the closest position, the outer elastic members 3b and 3c are, as shown in FIG. 3B, pressed against the inside of the concave part 10a of the separators 5b and 5c into an elastically deformed state. As a result, the elastically deformed outer elastic members 3b and 3c serve to seal the space between the frame built-up surface 9 and the separator built-up surface 10 from the outside of the single cell 20.

The structure of the MEA-frame assembly 15 having such an elastic member will be described in more detail. Upon describing this, a schematic partial enlarged view (perspective view) of the vicinity of the end part of the MEA-frame assembly 15 is shown in FIG. 4, and a sectional view along the line A-A in FIG. 4 is shown in FIG. 5.

Figure 4:
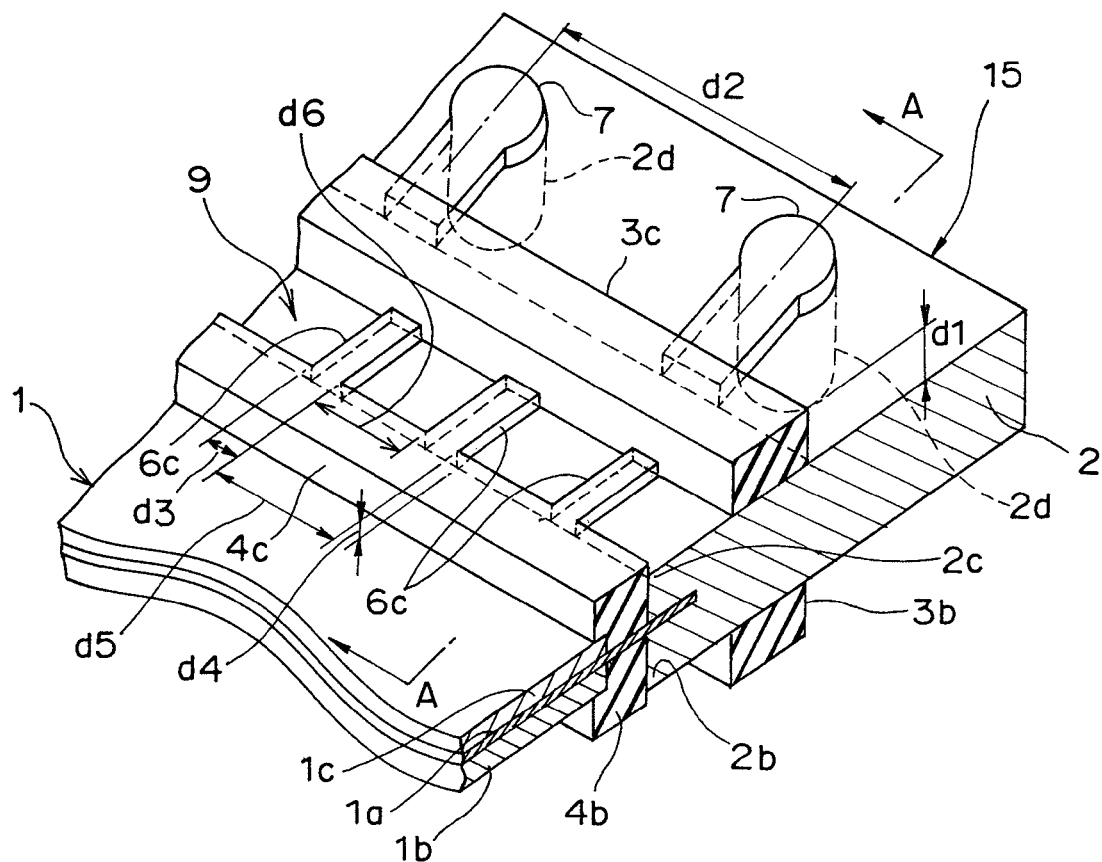
FIG. 4 is a schematic partial perspective view of a MEA-frame assembly.
Figure 5:
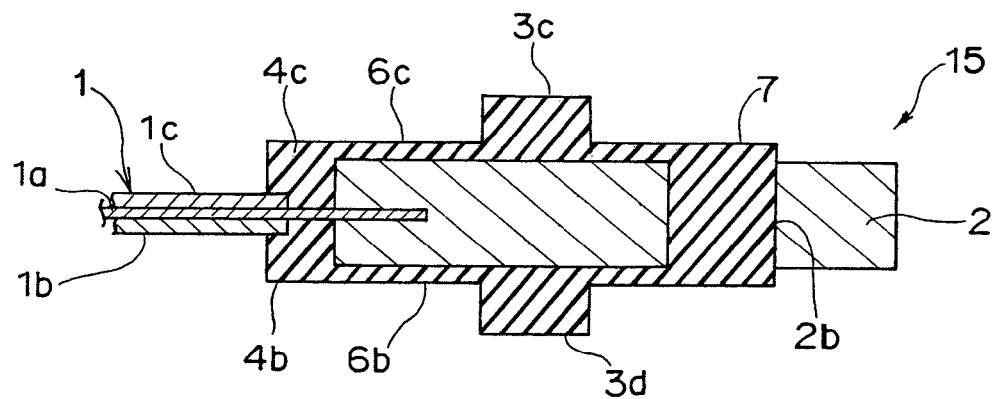
FIG. 5 is a sectional view along the line A-A in the MEA-frame assembly of FIG. 4.

As shown in FIGS. 4 and 5, the inner elastic members 4b and 4c are formed on the frame 2 of the MEA-frame assembly 15 in such a manner that they are extended along the inner peripheries 2b and 2c, respectively. Moreover, on the frame built-up surface 9, the outer elastic bodies 3b and 3c are formed in such a manner as to be extended in parallel to the inner elastic members 4b and 4c at a position apart in the outside direction from the inner elastic members 4b and 4c. Moreover, a plurality of connecting elastic members 6b are formed that respectively connect the anode side inner elastic body 4b with the anode side outer elastic member 3b at a plurality of positions and have a rectangular section. Similarly, a plurality of connecting elastic members 6c are formed that respectively connect the cathode side inner elastic body 4c with the cathode side outer elastic member 3c at a plurality of positions and have a rectangular section.

The elastic members 3b, 3c, 4b, 4c, 6b and 6c are each formed integrally using an elastic resin by injection molding. Agate trace 7 formed as a trace of resin injection opening (gate) for injecting a resin in such injection molding is formed in such a manner as to be communicated only with the outer elastic members 3b and 3c. Specifically, as shown in FIGS. 4 and 5, the gate trace 7 is formed so as to communicate the anode side and cathode side frame built-up surfaces 9 and at the same time, to connect with the anode side outer elastic member 3b and with the cathode side outer elastic member 3c by using a through hole 2d penetrating through the frame 2.

The above arrangement and connecting structure of the gate trace (gate) 7, outer elastic members 3b and 3c, connecting elastic members 6b and 6c and inner elastic members 4b and 4c are adopted and an elastic resin injected into the gate corresponding to the gate trace 7 is thereby filled in a flow passage corresponding to the outer elastic members 3b and 3c and furthermore filled in a flow passage corresponding to the inner elastic members 4b and 4c through the flow passage corresponding to the connecting elastic members 6b and 6c respectively, thereby forming each elastic member in a mold flow passage forming each elastic member. Such a formation method using injection molding will be described later.

Figure 14A:
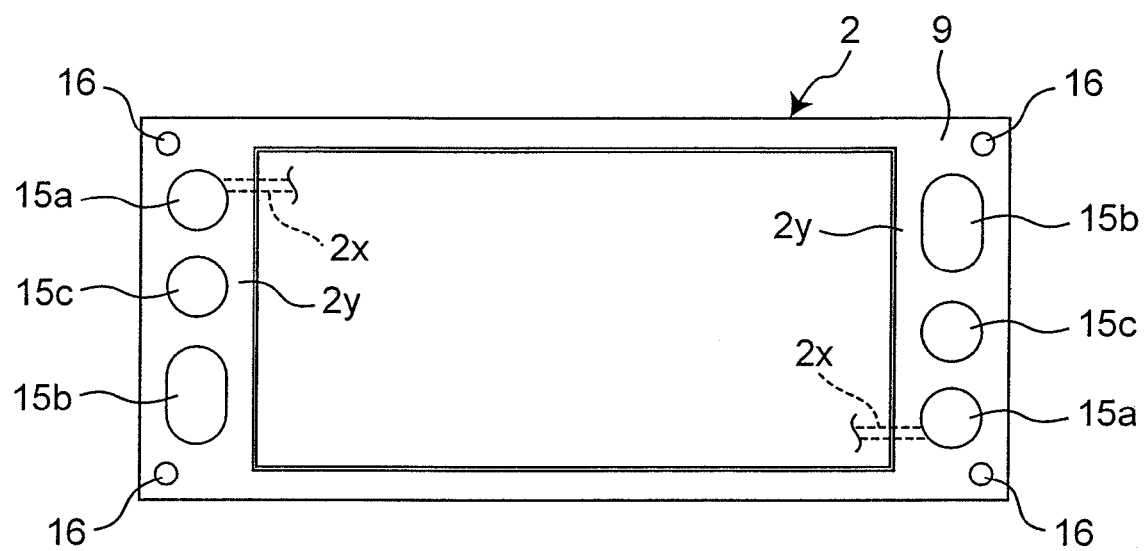
FIG. 14A is a plan view of a frame of a unit cell in the first embodiment.
Figure 14B:
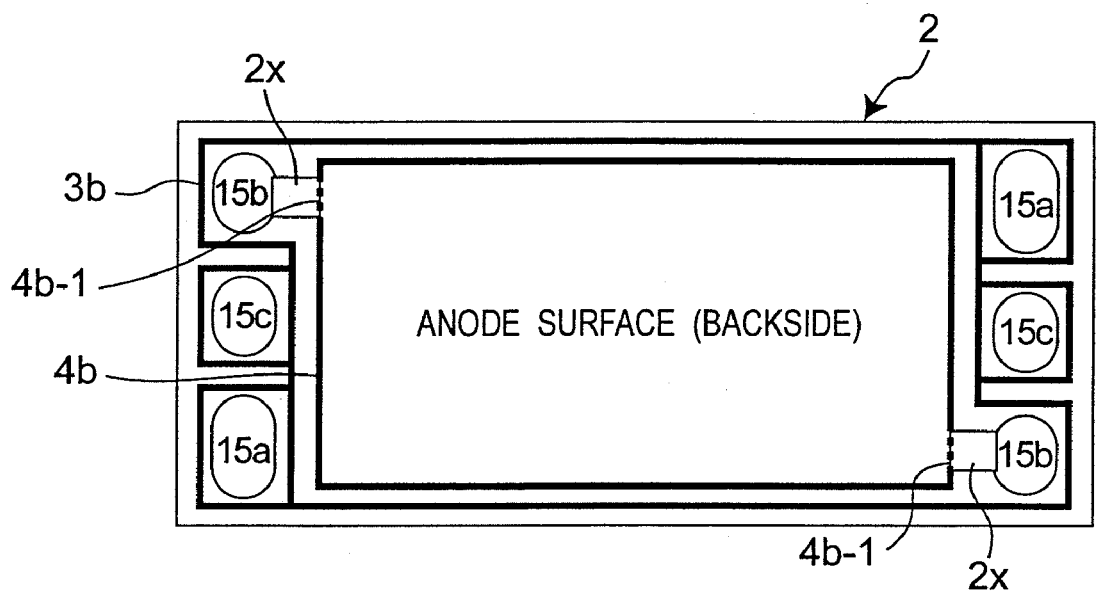
FIG. 14B is a front view of the anode side surface of a frame of the above unit cell of the first embodiment.
Figure 14C:
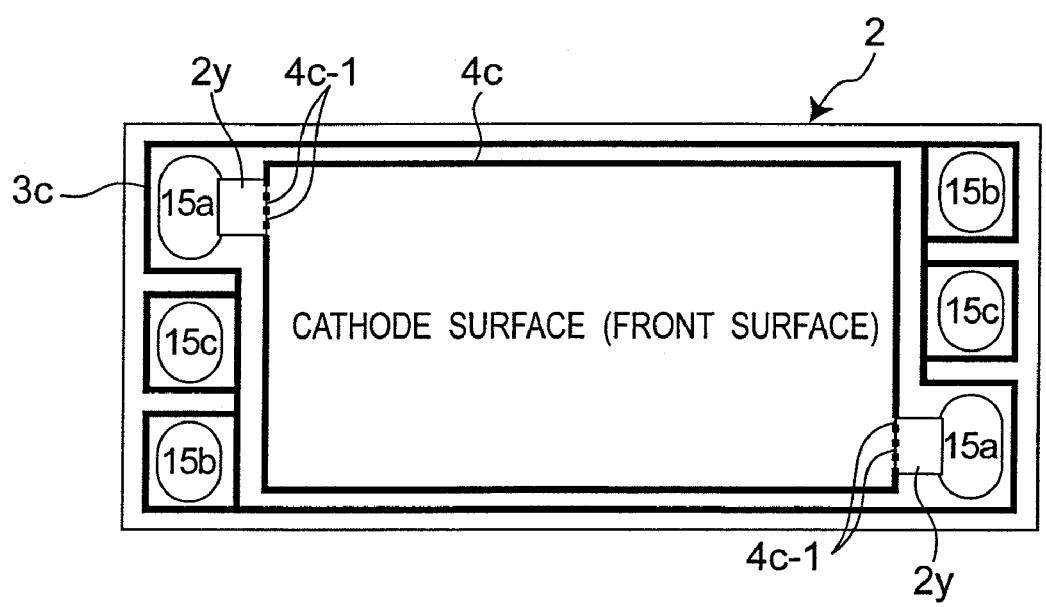
FIG. 14C is a front view of the cathode side surface of a frame of the above unit cell of the first embodiment.
Figure 15:
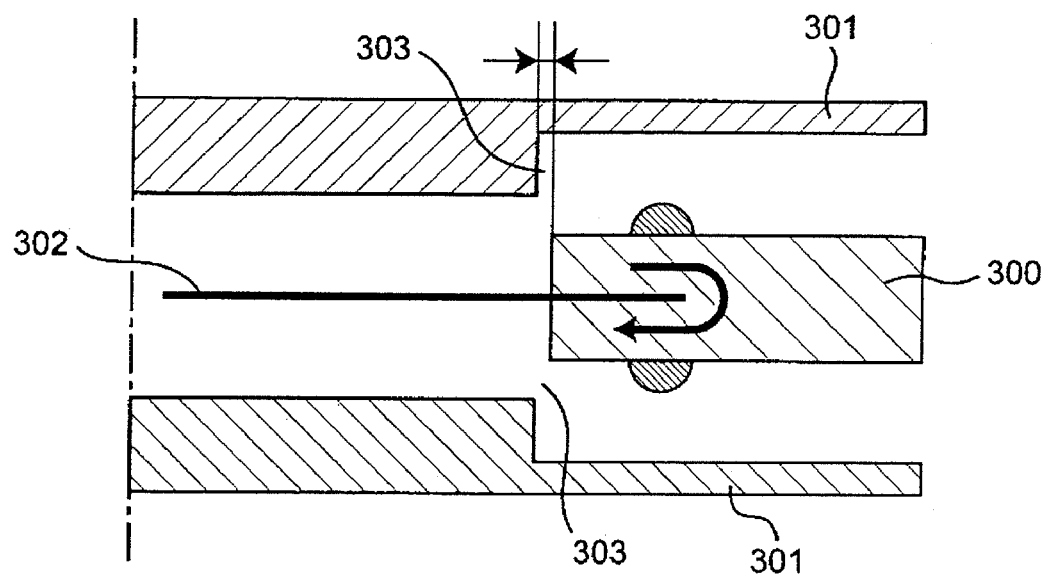
FIG. 15 is an exploded sectional view of an electrode-membrane-frame assembly of an example of a conventional solid polymer electrolyte fuel cell.
Figure 16:
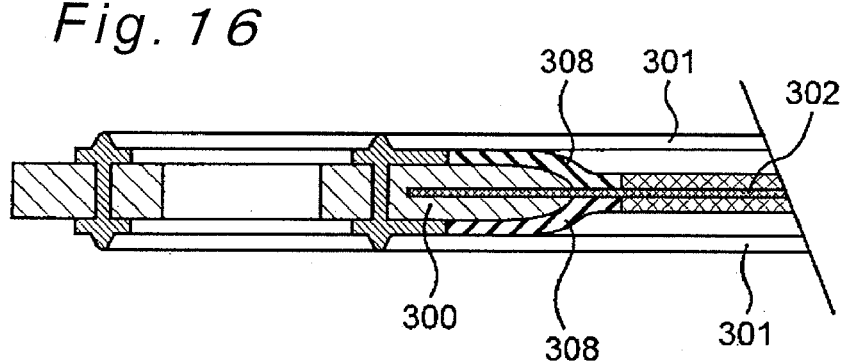
FIG. 16 is a sectional view of an electrode-membrane-frame assembly of an example of a conventional solid polymer electrolyte fuel cell.

Here, a schematic plan view of the frame 2 of the MEA-frame assembly 15 is shown in FIGS. 14A to 14C. The frame 2 is, as shown in FIGS. 14A to 14C, provided with at least a pair of gas supply parts, that is, a fuel gas manifold hole 15a, an oxidizer gas manifold hole 15b and a cooling water manifold hole 15c. Further, the frame 2 is further provided with a plurality of through-holes 16 for passing a bolt (not shown) that fastens the single cells 20 one another. Oxidizer gas is supplied to the cathode electrode 1c side and discharged from the pair of oxidizer gas manifold holes 15b of the frame 2. From the pair of fuel gas manifold holes 15a of the frame 2, fuel gas is supplied to the anode electrode 1b side and discharged. Further, cooling water is supplied to the space between the backsides of the separators 5b and 5c of the neighboring single cells 20 which backsides are facing each other and discharged from the pair of cooling water manifold holes 15c.

The frame 2 is furthermore provided with the outer elastic member 3 which functions as a gasket enclosing the whole region which contains the oxidizer gas manifold hole 15b and an oxidizer gas flow passage (gas flow passage section) 2y and where oxidizer gas passes in the cathode electrode 1c on the frame built-up surface 9 which is the surface on the side where the cathode electrode 1c is positioned. Further, the frame 2 is provided with the outer elastic member 3b which functions as a gasket enclosing the whole region which contains the fuel gas manifold hole 15a and a fuel gas flow passage (gas flow passage section) 2x and where fuel gas passes in the anode electrode 1b on the frame built-up surface 9 which is the surface on the side where the anode electrode 1b of the frame 2 is positioned. Further, the outer elastic members 3b and 3c are so designed that they are respectively isolated from the region where the gas passes and only enclose the cooling water manifold hole 15c. Accordingly, it is so devised that after the single cell is fabricated, the outer elastic members 3b and 3c are inserted into the concave parts of the separator built-up surfaces 10 of the separators 5b and 5c and elastically deformed in contact with that concave parts respectively to thereby prevent the leak of the fuel gas, oxidizer gas and cooling water on the cathode side and the anode side independently. Here, in FIGS. 14A to 14C, the illustrations of a plurality of connecting elastic members 6b and 6c are not given. However, it is preferable that the connecting elastic member 6c be not arranged in the vicinity of the gas flow passage part 4c-1 of the cathode side inner elastic member 4c but be arranged in the vicinity of its periphery to thereby secure a gas flow passage. Further, the anode side has the same structure and it is therefore possible to form a space for gas supply between the gas flow passage part 4b-1 of the anode side inner elastic member 4b and the anode side separator 5b without fail. The outer elastic members 3b and 3c are continuously formed over the whole periphery of the frame 2 in this manner and further, the inner elastic members 4b and 4c are continuously formed over the entire periphery of the frame 2 except for the position where the gas supply passage from the gas supply section is formed.

Further, as the elastic resin material forming these elastic members, it is preferable to use, for example, a thermoplastic elastomer. A specific example of the elastic resin material includes Milastomer™, high hardness M3800 manufactured by Mitsui Chemicals, Inc. Further, as requirements for accomplishing elastic deformation of each of the elastic members without fail, any elastic member may be used as long as it has the elasticity of A50 to A90 or D37 to D60 prescribed in JIS K 6253.

Specific examples of the material of the frame include R-250G or R-350G manufactured by Prime Polymer Co., Ltd. Specific examples of the material of the separator include a resin-impregnated graphite plate (glassy carbon manufactured by Tokai Carbon Co., Ltd.) having an external dimension of 120 mm×120 mm and a thickness of 3.0 mm.

When the separators 5b and 5c are stacked on the MEA-frame assembly 15 in the fabrication of the single cell 20, the inner elastic members 4b and 4c are, as shown in FIG. 3B, compressed and elastically deformed by the separators 5b and 5c, respectively. As a result, the polymer electrolyte membrane 1a is pressed along the thickness direction thereof by the compression force of the inner elastic members 4b and 4c. Therefore, even if the polymer electrolyte membrane 1a is not attached to the inner elastic members 4b and 4c, the inner elastic members 4b and 4c are brought into close contact with the polymer electrolyte membrane 1a by this pressure and the elasticity of the inner elastic members 4b and 4c, ensuring that the space between the both is sealed without fail. Further, the clearance S1 between each of the outer periphery of the anode electrode 1b and the outer periphery of the cathode electrode 1c and the inner peripheries 2b and 2c of the frame 2 can be remarkably reduced, or can be eliminated by elastic deformation of the inner elastic members 4b and 4c between the separators 5b and 5c and frame 2. Specifically, the clearance S1 can be substantially eliminated.

Therefore, the space between the frame 2 and the anode side separator 5b and the space between the frame 2 and the cathode side separator 5c are respectively sealed hermetically by the anode side inner elastic member 4b and the cathode side inner elastic member 4c which are elastically deformed, making it possible to efficiently prevent the cross leak phenomenon (phenomenon in which cross leak arises) in which gas passes through the clearance between the polymer electrolyte membrane 1a and the frame 2. Moreover, the space above the polymer electrolyte membrane 1a between the outer periphery of the anode electrode 1b and the inner periphery of the frame 2, and the space above the polymer electrolyte membrane 1a between the outer periphery of the cathode electrode 1c and the inner periphery of the frame 2 are filled with the elastically deformed inner elastic members 4b and 4c respectively. Therefore, the short-cut flow of the reductant gas along the inner periphery of the frame 2 and the short-cut flow of the oxidizer gas along the inner periphery of the frame 2 can be prevent, respectively. As a result, each utilization ratio of the reductant gas and the oxidizer gas can be more enhanced, whereby the performance of the polymer electrolyte fuel cell can be more improved.

Further, the effect of preventing such a short-cut flow can also be obtained by each of the connecting elastic members 6b and 6c. Moreover, the outer elastic members 3b and 3c can be made to function as the conventional gasket.

Next, a method for forming each of the elastic members having such structures by injection molding will be described with reference to schematic explanatory views shown in FIGS. 6A to 6E.

First, as shown in FIG. 6A, an upper mold 50 and a lower mold 60 are prepared in which the MEA-frame assembly 15 (MEA-frame assembly in the situation before the elastic members are formed) in the state that the MEA 1 and the frame 2 are integrated is arranged. In the lower mold 60, the MEA-frame assembly 15 is arranged on its upper surface and at the same time, a flow passage formation surface 61 which is a concavity and convexity part for forming a prescribed flow passage between the lower mold 60 and the lower surface of the MEA-frame assembly 15 is formed. The lower mold 60 is furthermore provided with a bar-like raising member 62 that separates the MEA-frame assembly 15 together with the molded resin from the flow passage formation surface 61. The upper mold 50 covers the upper surface of the MEA-frame assembly 15 with the lower surface thereof and at the same time, is also formed with a flow passage formation surface 51 which is an concavity and convexity part for forming a prescribed flow passage between itself and the upper surface of the MEA-frame assembly 15. Moreover, a plurality of gates 52 which are resin injection openings are formed on this flow passage formation surface 51 and each gate 52 is communicated with a resin introduction section 53 which is a concave part formed on the upper surface of the upper mold 50. Further, the upper mold 50 is provided with a clamping member 54 that clamps the upper mold 50 and the lower mold 60 in the condition where the both molds are aligned. Here, as shown in FIG. 6A, a through hole 2d is formed in advance in the frame 2 of the MEA-frame assembly at a position corresponding to each gate 52.

Figure 6B:
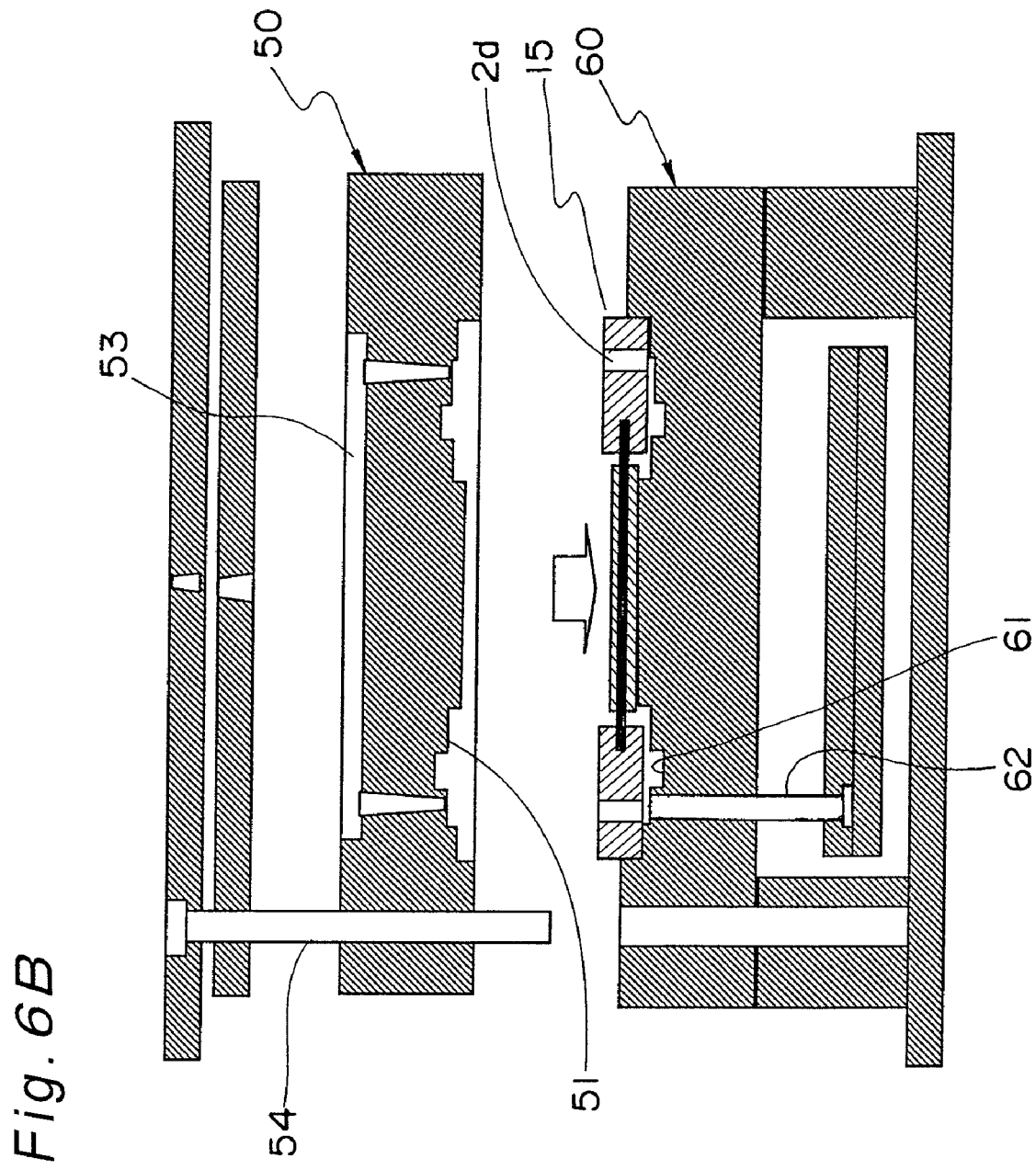
FIG. 6B is a schematic view showing the procedures for forming the elastic member of the MEA-frame assembly of the first embodiment by injection molding.
Figure 6C:
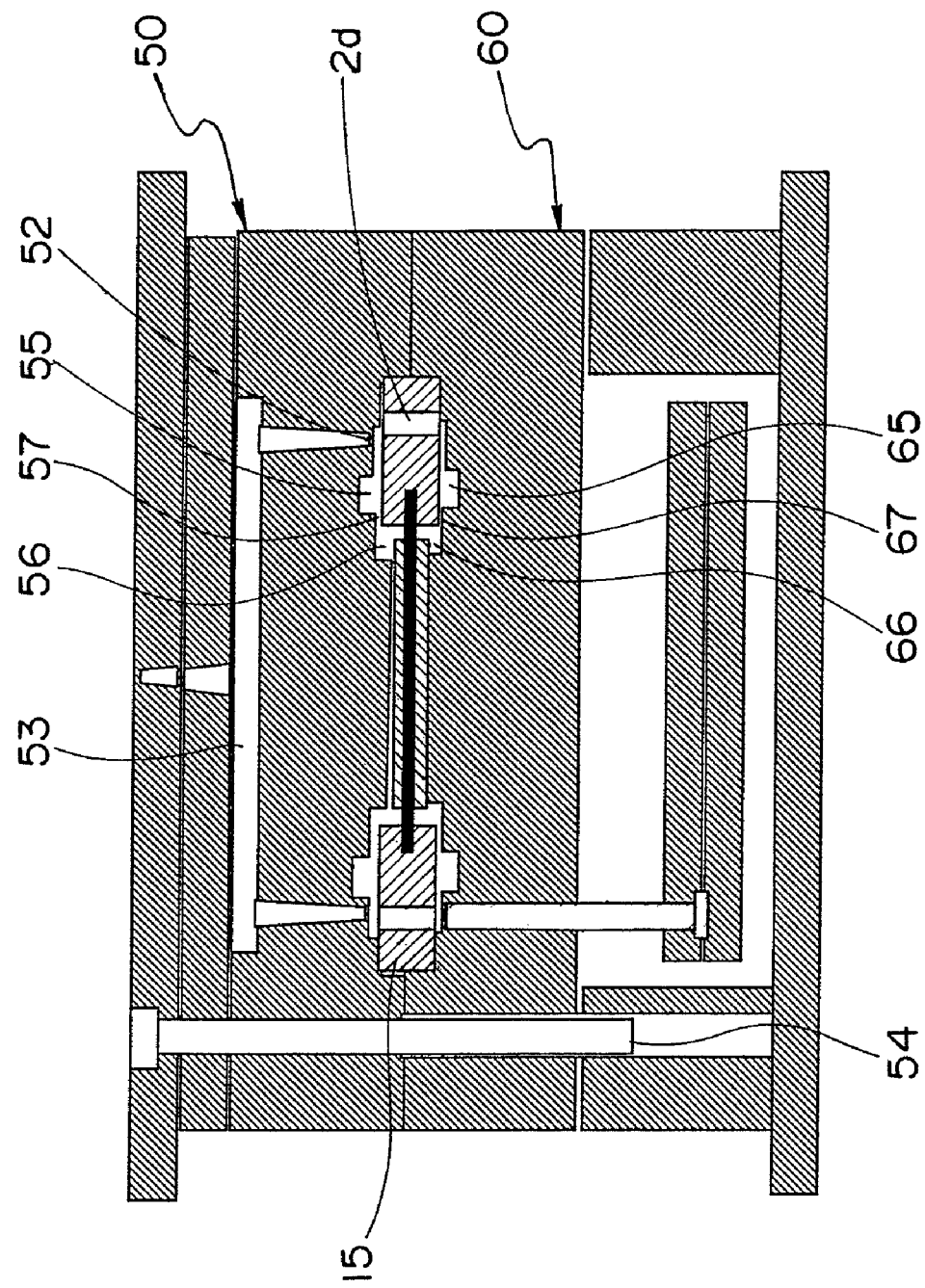
FIG. 6C is a schematic view showing the procedures for forming the elastic member of the MEA-frame assembly of the first embodiment by injection molding.

Next, as shown in FIG. 6B, the MEA-frame assembly 15 is mounted on the flow passage formation surface 61 of the lower mold 60. After that, as shown in FIG. 6C, the upper mold 50 and the lower mold 60 mounted with the MEA-frame assembly 15 are clamped by the clamping member 54. In the situation where the both molds are clamped, a flow passage in which a resin is allowed to flow and to be filled is formed between each of the flow passage formation surfaces 51 and 61 and the MEA-frame assembly 15.

Specifically, a first resin flow passage 65 corresponding to the anode side outer elastic member 3b, a second resin flow passage 66 corresponding to the inner elastic member 4b and a plurality of communicating resin passages 67 (flow passages corresponding to the connecting elastic member 6b) that communicates the first resin flow passage 65 with the second resin flow passage 66 are formed between the passage formation surface 61 of the lower mold 60 and the MEA-frame assembly 15. Further, a first resin flow passage 55 corresponding to the cathode side outer elastic member 3c, a second resin flow passage 56 corresponding to the inner elastic member 4c and a plurality of communicating resin passages 57 (flow passages corresponding to the connecting elastic member 6c) that communicates the first resin flow passage 55 with the second resin flow passage 56 are formed between the flow passage formation surface 51 of the upper mold 50 and the MEA-frame assembly 15. Here, as is also clear from FIG. 6c, the first resin flow passages 55 and 65 and the second resin flow passages 56 and 66 are formed into a horizontally frame form along the frame 2.

Figure 6D:
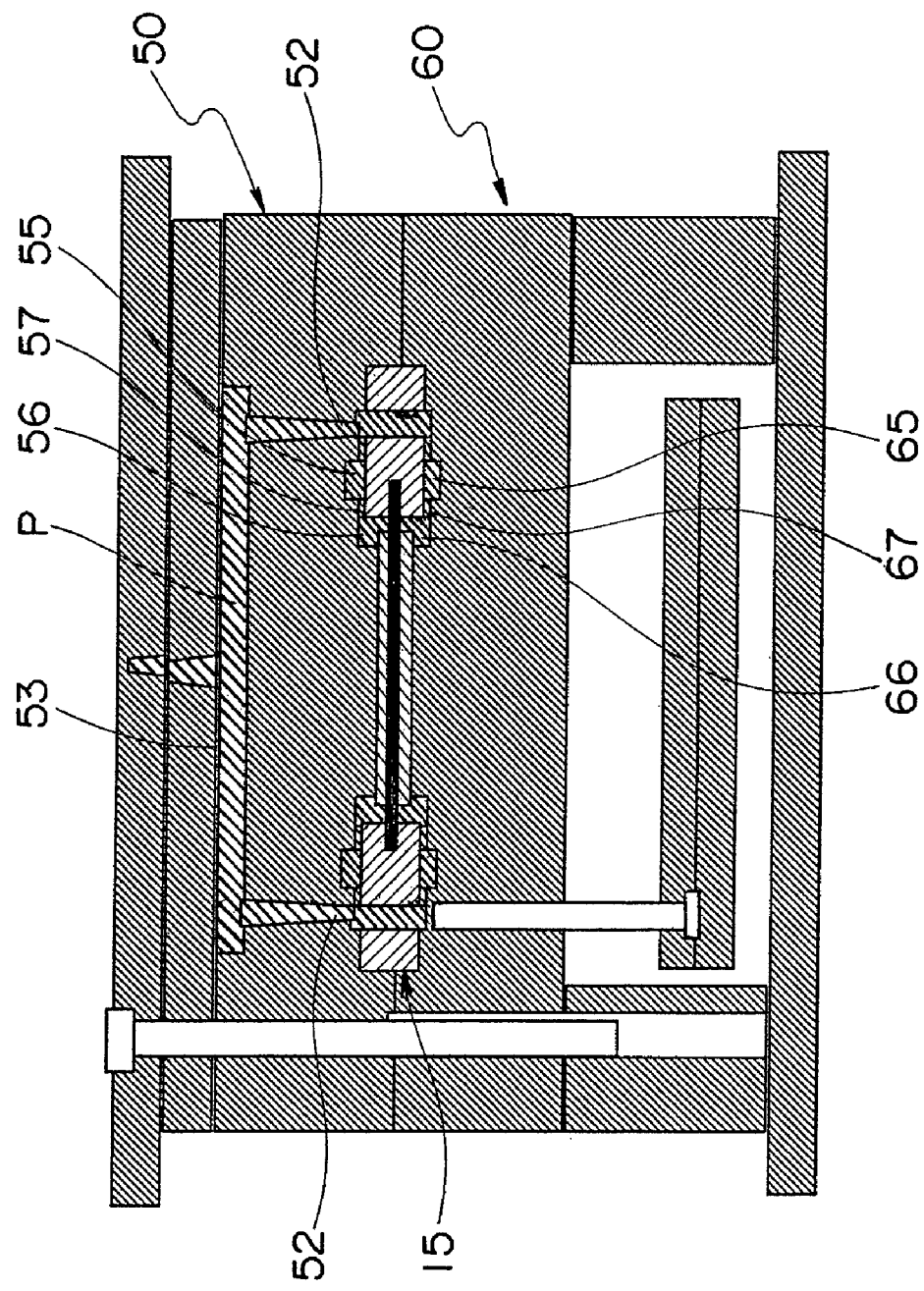
FIG. 6D is a schematic view showing the procedures for forming the elastic member of the MEA-frame assembly of the first embodiment by injection molding.

Next, as shown in FIG. 6D, an elastic resin is ejected and injected into the mold. Specifically, the ejected and injected elastic resin P in the resin introduction section 53 of the upper mold 50 is first injected into the first resin flow passage 55 formed on the upper mold 50 side through each gate 52 and at the same time, injected into the first resin flow passage 65 formed on the lower mold 60 side through each through-hole 2d of the frame 2. Next, the resin injected into each of the first resin flow passages 55 and 56 is flowed into each of the second resin flow passages 56 and 66 through the communicating resin flow passages 57 and 67, respectively. The resin is filled in each passage by such a flow of the resin.

Since the resin is first injected into the first resin flow passages 55 and 65 from the gate 52, a variation in pressure when the resin is injected is absorbed to thereby reduce the dispersion of resin pressure at each position in the flow passage. In other words, the pressure of the resin can be uniformed. Furthermore, the resin is made to flow into the second resin flow passages 55 and 66 from the first resin flow passages 55 and 56 through the communicating resin flow passages 57 and 67 respectively, whereby the pressure can be furthermore made uniform. Further, the resin is allowed to pass through each of the communicating resin flow passages 57 and 67 and filled in the second resin flow passages 56 and 66 from the first resin flow passages 55 and 55, whereby the dispersion of filling time (resin arrival time) at each position in the second resin flow passages 56 and 66 can be reduced. In other words, the dispersion of temperature of the resin at a position can be reduced, making it possible to uniform the temperature of the resin. Particularly, in injection molding in this manner, a high-temperature and high-pressure resin is to be injected, however, a resin decreased in the dispersion of temperature is introduced under uniformed pressure into the junction between the electrode portion which is a part relative lower in thermal strength and the frame 2, and it is therefore possible to form an elastic member by injection molding while preventing the junction from being damaged.

Figure 6E:
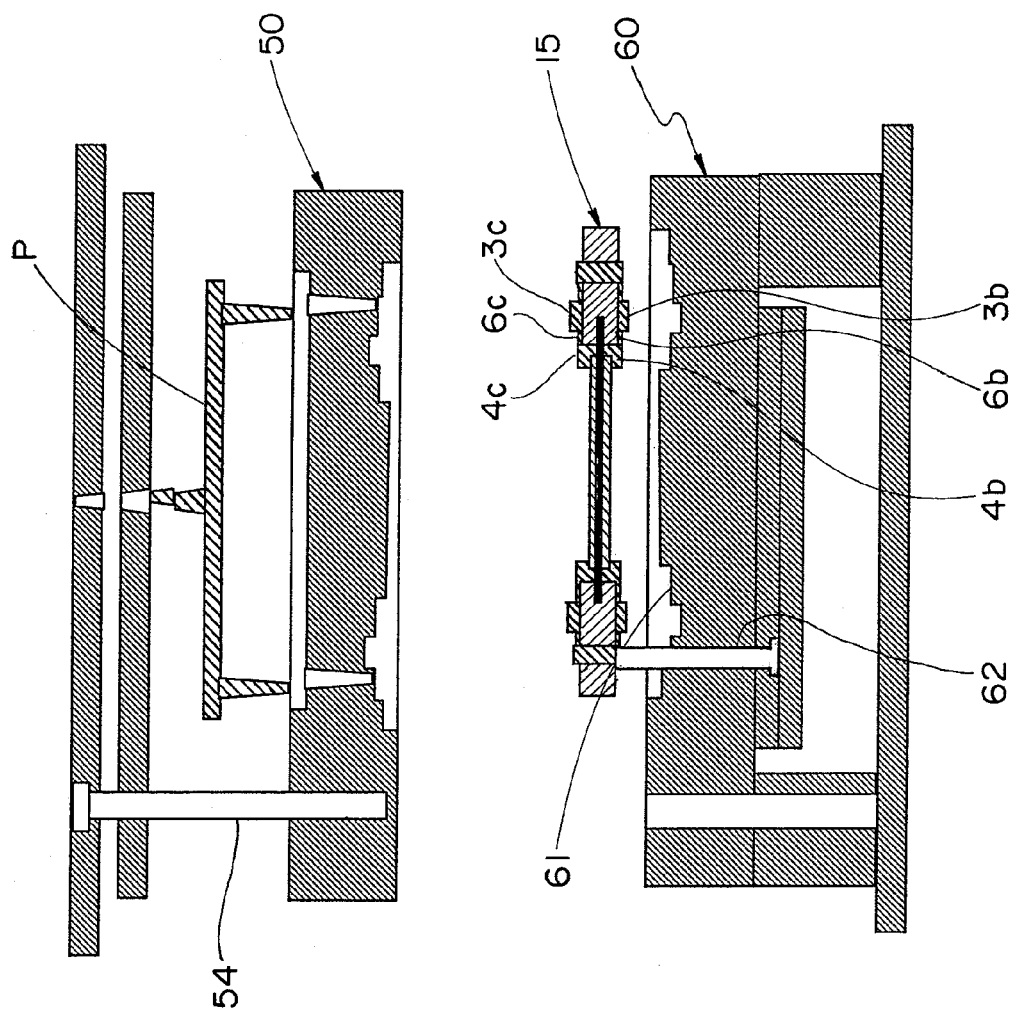
FIG. 6E is a schematic view showing the procedures for forming the elastic member of the MEA-frame assembly of the first embodiment by injection molding.

When the filling of the resin in all flow passages is completed, the resin is cured. After that, as shown in FIG. 6E, the clamping force applied to the upper mold 50 and the lower mold 60 is released and the MEA-frame assembly 15 provided with elastic members formed at positions corresponding to the passages is released from the flow passage formation surface 61 of the lower mold 60 by the raising member 62. Here, the injection molding is completed.

As a result of the completion of this injection molding, as shown in FIG. 4, the anode side outer elastic member 3b is formed at a position corresponding to the first resin flow passage 65, the inner elastic member 4b is formed at a position corresponding to the second resin flow passage 66 and the connecting elastic member 6b is formed at a position corresponding to each communicating resin flow passage 67 in the MEA-frame assembly 15. Further, in the MEA-frame assembly 15, the cathode side outer elastic member 3c is formed at a position corresponding to the first resin flow passage 55, the inner elastic member 4c is formed at a position corresponding to the second resin flow passage 56 and the connecting elastic member 6c is formed at a position corresponding to each communicating resin flow passage 57. Further, the gate trace 7 is formed at a position corresponding to the gate 52 and through-hole 2d.

Here, a description of the preferable shape and arrangement of each elastic member for attaining the resin pressure uniformity and the resin arrival time uniformity in injection molding in this manner is given with reference to FIG. 4.

First, the dimension d1 of each thickness of the outer elastic members 3b and 3c is designed to be preferably in a range from 0.5 mm to 4.0 mm. Further, the sectional area of the member is designed to be preferably in a range from 1 mm² to 20 mm². If the dimension of the thickness or the sectional area is excessively smaller than the above range, the outer elastic member dose not function as a resin buffer for making the pressure uniform, whereas if the dimension is excessively larger than the above range, the resin material becomes useless.

The formation interval d2 of the gate trace (gate) 7 is preferably in a range from 20 to 100 mm. This is because if the interval is low, the resin material becomes useless whereas if the interval is wide, it is difficult to make the pressure uniform.

The dimension d3 of each width of the connecting elastic members 6b and 6c is designed to be preferably in a range from 0.5 mm to 3.0 mm and the dimension d4 of each thickness is designed to be preferably 0.5 mm to 3.0 mm. In the case where the dimensions are smaller than the above range, pressure loss in the flow of the resin is large, therefore it is difficult to obtain uniform pressure. Further, if the sectional area of the connecting elastic members 6b and 6c is not made to be smaller than at least the sectional area of the outer elastic members 3b and 3c, it is difficult to obtain the effect of pressure uniformity. Here, each sectional area of the connecting elastic members 6b and 6c is preferably designed to be about 5 to 70% based on each sectional area of the outer elastic members 3b and 3c. Moreover, the formation of interval pitch d5 of the connecting elastic members 6b and 6c is preferably designed to be in a range from 3.0 mm to 20 mm. When the pitch is less than the above range, it is difficult to manufacture the connecting elastic members, whereas if the pitch exceeds the above range, the effect of pressure uniformity is decreased.

The relation between the dimension d3 of each width of the connecting elastic members 6b and 6c and the interval dimension d6 (interval dimension d6=formation interval pitch d5−width dimension d3) of each of the neighboring connecting elastic members 6b and 6c preferably satisfies: $d3/d6 \leq 1$. If the requirements of such relation are made to be satisfied, the frame 2 can sufficiently stand to the resin-filling pressure when the elastic member is formed.

Figure 7:
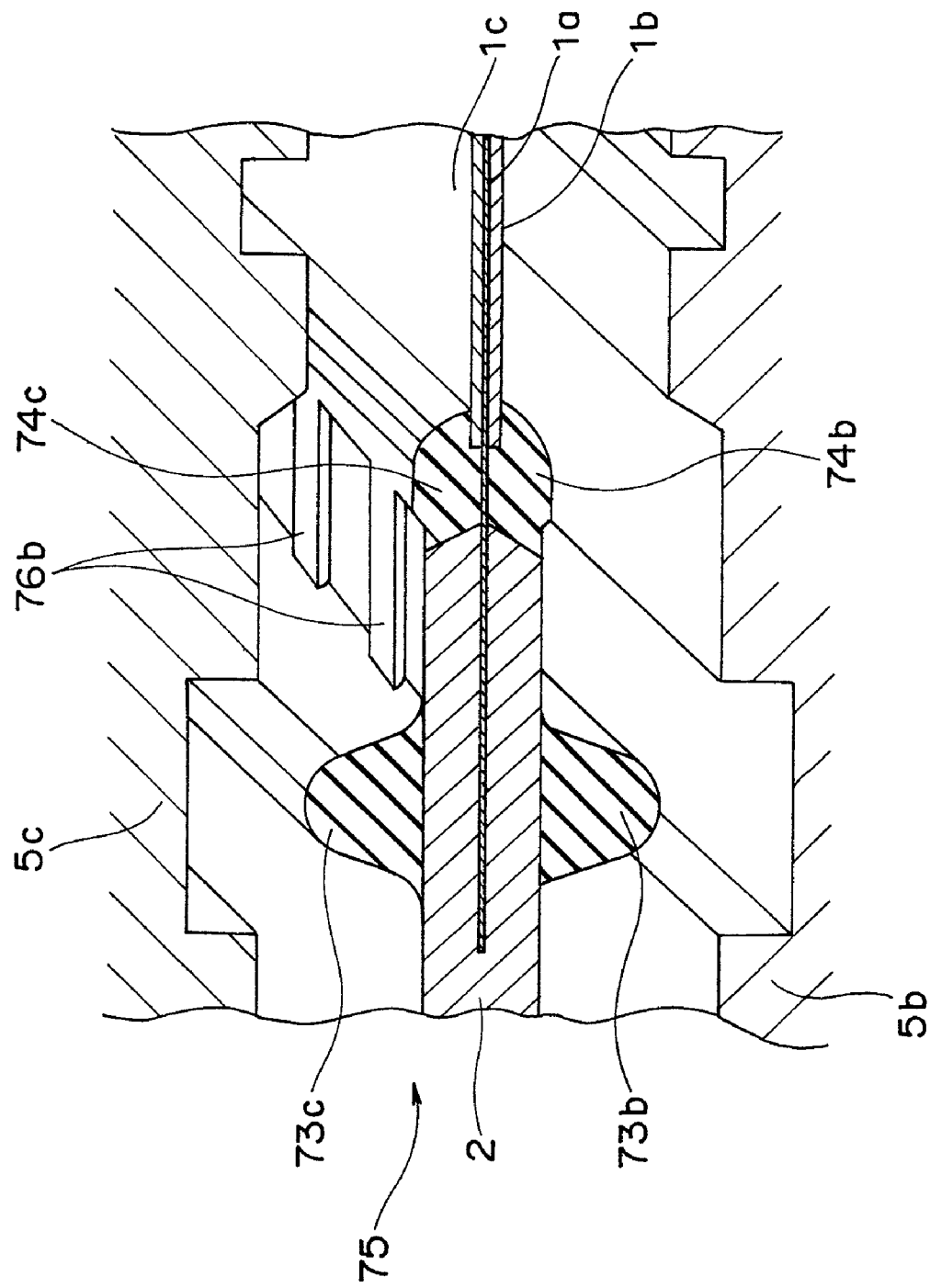
FIG. 7 is a schematic view of a unit cell according to a modification of a first embodiment.

In the above descriptions of this embodiment, the case where each of the outer elastic members 3b and 3c and the inner elastic members 4b and 4c has a rectangular section is described, however, this embodiment is not limited only to such a case. For example, the case where, like the MEA-frame assembly 75 according to a modification shown by the schematic perspective view of FIG. 7, inner elastic members 74b and 74c each having a sectional shape with a slant surface and outer elastic members 73b and 73c each having a sectional shape with a smooth rise curvature are formed may be adopted instead of the above case. With such a structure, a MEA-frame assembly can be provided which is superior in hermetically sealing property and is resistant to damages or the like while suppressing the amount of the resin to be used. Here, in the MEA-frame assembly 75 shown in FIG. 7, a plurality of connecting elastic members 76b are also formed that connect the outer elastic members 73b and 73c with the inner elastic members 74b and 74c respectively.

Second Embodiment

Figure 8A:
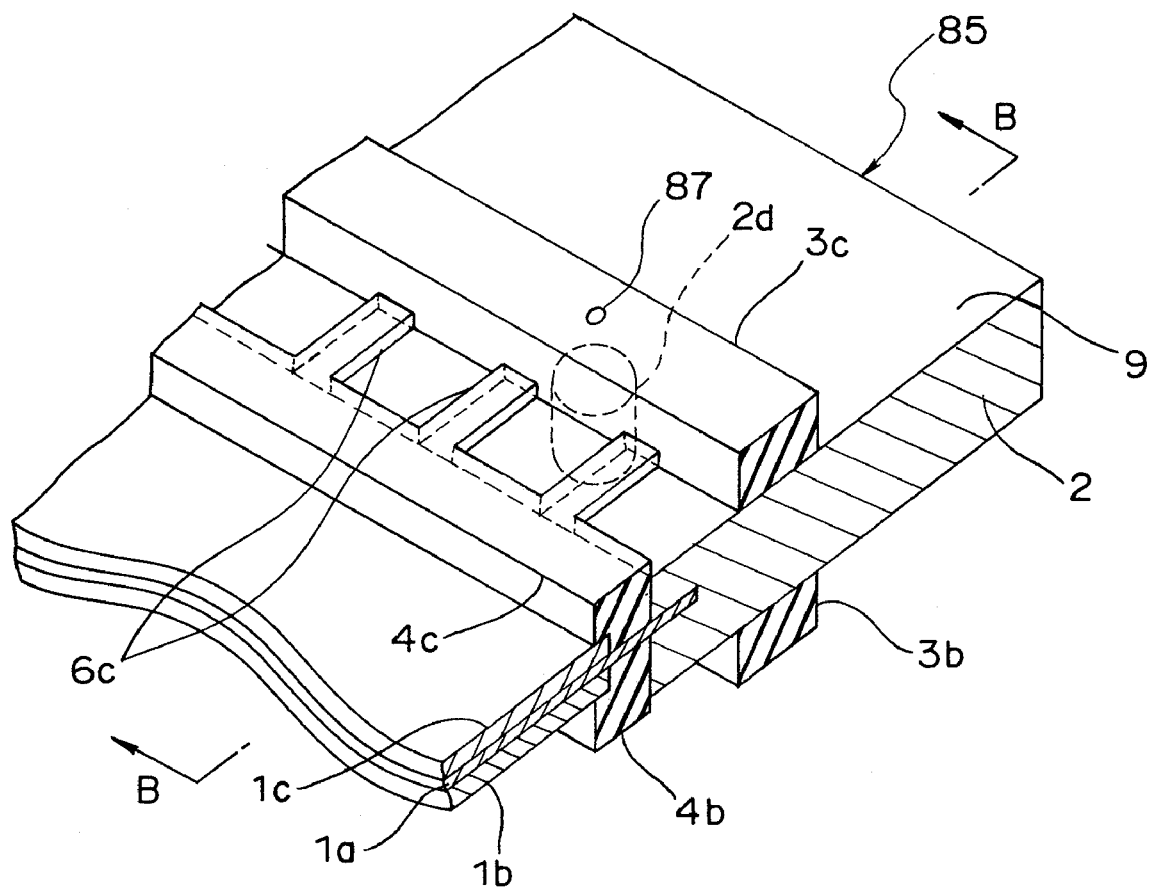
FIG. 8A is a schematic perspective view of a MEA-frame assembly according to a second embodiment of the present invention.
Figure 8B:
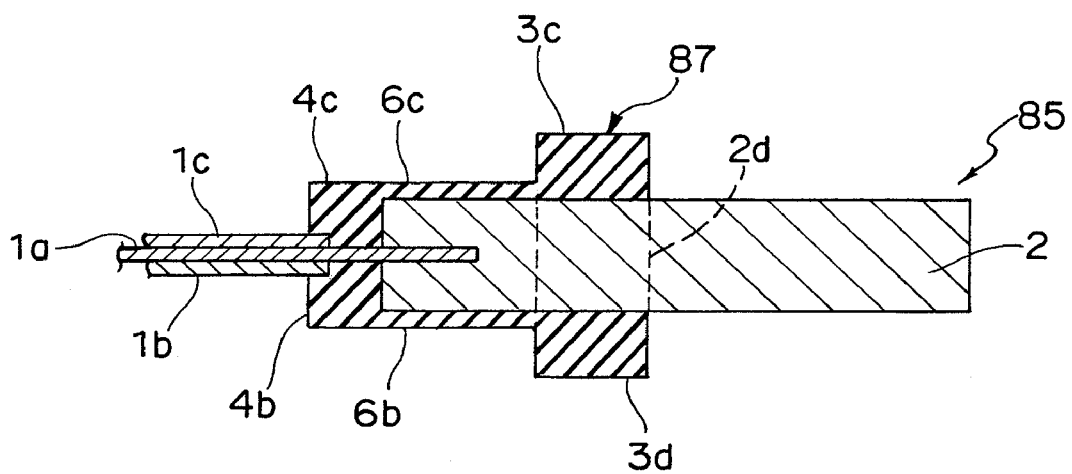
FIG. 8B is a sectional view along the line B-B in the MEA-frame assembly of FIG. 8A.

Here, the present invention is not limited to the above embodiment and may be practiced in other various embodiments. For example, FIG. 8A shows a schematic partial perspective view of a MEA-frame assembly 85 with which a fuel cell is provided according to a second embodiment of the present invention and FIG. 8B shows a sectional view along the line B-B of FIG. 8A. Here, in the following descriptions, the same structural members as those of the MEA-frame assembly of the above first embodiment are designated as the same reference numbers and the descriptions of these members are not given.

As shown in FIGS. 8A and 8B, the MEA-frame assembly 85 of this second embodiment is different from that of the first embodiment in the position of the gate which is the resin injection opening used to form each elastic member by injection molding. Specifically, a gate trace 87 is provided on the upper surface in illustration of the cathode side outer elastic member 3c. Moreover, a through-hole 2d is formed so as to penetrate through the frame 2 at a position just under illustration of the gate trace 87.

According to such a structure of the MEA-frame assembly 85 of this second embodiment, the position of the gate is set to the upper surface of the outer elastic member 3c and therefore, the region on the frame built-up surface 9 can be utilized efficiently.

Third Embodiment

Figure 9:
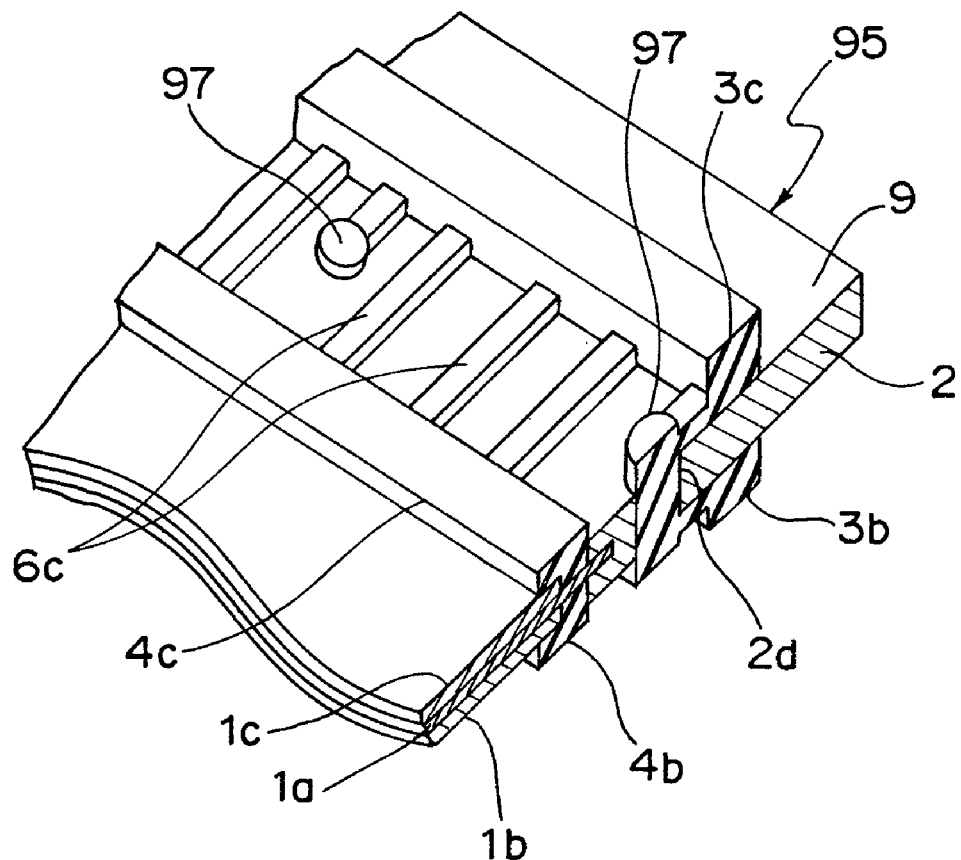
FIG. 9 is a schematic perspective view of a MEA-frame assembly according to a third embodiment of the present invention.

Next, a schematic partial perspective view of a MEA-frame assembly 95 with which a fuel cell is provided according to a third embodiment of the present invention is shown in FIG. 9. As shown in FIG. 9, the MEA-frame assembly 95 of this third embodiment is furthermore different from those of the above first and second embodiments in the position of the gate which is the resin injection opening in the injection molding. Specifically, a gate trace 97 is arranged in the space between the connecting elastic members 6c between the cathode side outer elastic member 3c and the inner elastic member 4c. Here, a through-hole 2d is formed so as to penetrate through the frame 2 at a position just under illustration of the gate trace 97.

According to the structure of the MEA-frame assembly 95 of this third embodiment, the gate is positioned between the outer elastic member 3c and the inner elastic member 4c and therefore, the space between the elastic members can be utilized efficiently, leading to efficient use of the area on the frame built-up surface 9. Further, unlike the above second embodiment, the gate trace 87 is not formed on the upper surface of the outer elastic member 3c, and therefore, the hermetically sealing function of the outer elastic member 3c, that is, the function as a gasket for the outer elastic member 3c and the separator 5c is not hindered and hermetic sealing can be accomplished without fail.

Fourth Embodiment

Figure 10:
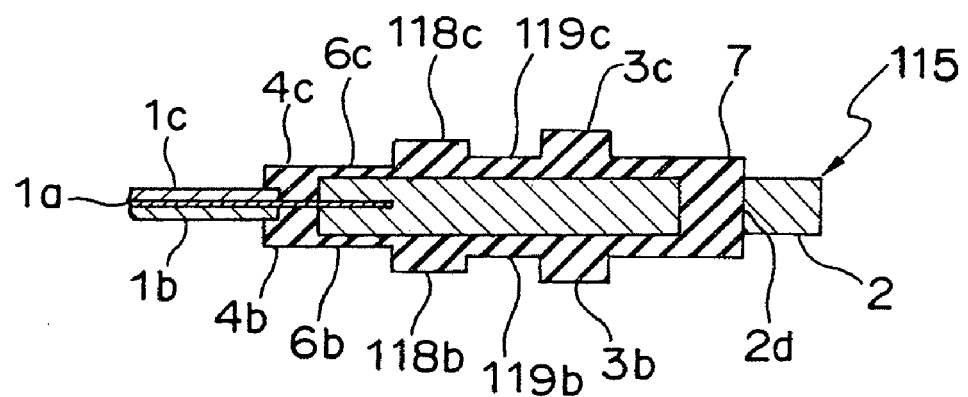
FIG. 10 is a schematic sectional view of a MEA-frame assembly according to a fourth embodiment of the present invention.

Next, a schematic partial sectional view of a MEA-frame assembly 115 with which a fuel cell is provided according to a fourth embodiment of the present invention is shown in FIG. 10. As shown in FIG. 10, the MEA-frame assembly 115 of this fourth embodiment is different from that of each of the above embodiments in the point that it is furthermore provided with intermediate elastic members 118b and 118c arranged so as to extend along each elastic member between the outer elastic members 3b and 3c and the inner elastic members 4b and 4c. Furthermore, the intermediate elastic members 118b and 118c are connected with the outer elastic members 3b and 3c by a plurality of connecting members 119b and 119c, respectively. Further, the intermediate elastic members 118b and 118c are connected with the inner elastic member 4b and 4c by a plurality of connecting members 6b and 6c, respectively.

In the structure of the MEA-frame assembly 115 of such third embodiment, the function as the resin buffer for making pressure uniform in the resin flow passage corresponding to the outer elastic member is achieved in a process divided into two stages using the resin flow passages corresponding to the outer elastic member and to the intermediate elastic member. Furthermore, the resin passes through the resin flow passages corresponding to at least two connecting resin members resultantly by the time when it reaches the resin passage corresponding to the inner elastic member. Therefore, the effect of the resin pressure uniformity and the arrival time of the resin flowed into the flow passage corresponding to the inner elastic member can be more enhanced.

Fifth Embodiment

Figure 11:
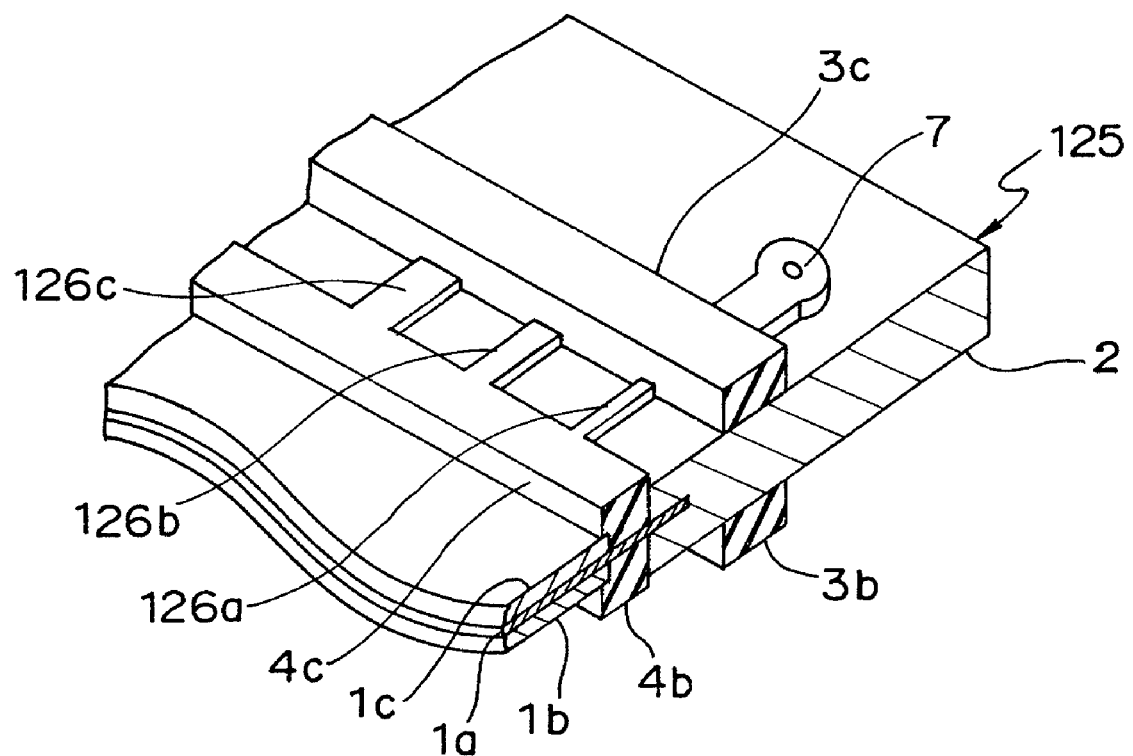
FIG. 11 is a schematic sectional view of a MEA-frame assembly according to a fifth embodiment of the present invention.

Next, a schematic partial perspective view of a MEA-frame assembly 125 with which a fuel cell is provided according to a fifth embodiment of the present invention is shown in FIG. 11. As shown in FIG. 11, the MEA-frame assembly 125 of this fifth embodiment is different from that of each of the above embodiments in the point that each of the connecting elastic members 126a, 126b and 126c is formed so as to have a larger sectional area than others in proportion to the distance from the gate trace (gate) 7. Specifically, in FIG. 11, each sectional area is designed so that the sectional area of the connecting elastic member 126a arranged at a position closest to the gate trace 7 is smallest, then, the connecting elastic member 126b has a larger sectional area and the connecting elastic member 126c has the largest sectional area, in this order.

Since each of the connecting elastic members 126a, 126b and 126c is designed to have a larger sectional area than others in proportion to the distance from the gate trace (gate) 7, pressure loss in the flow of the resin from the gate into the flow passage corresponding to the inner elastic member can be made uniform, thereby making it possible to enhance the effect of the resin pressure uniformity.

Sixth Embodiment

Figure 12A:
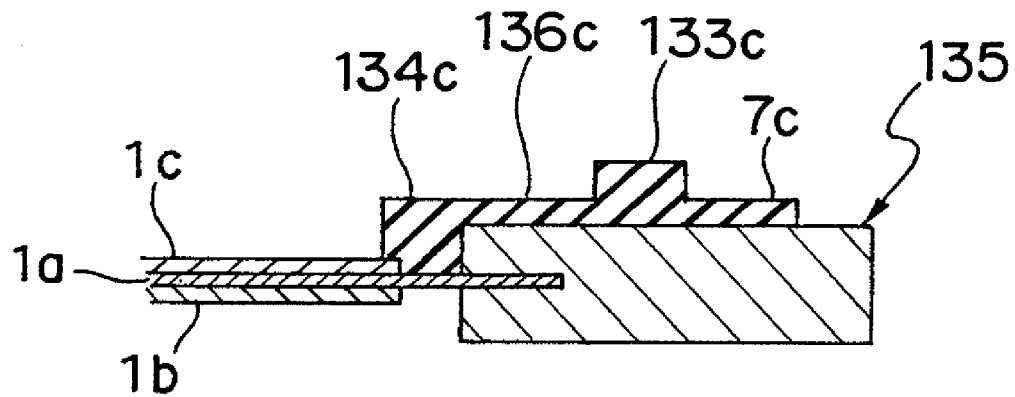
FIG. 12A is a schematic sectional view showing a method for forming an elastic member of a MEA-frame assembly according to a sixth embodiment of the present invention by injection molding.
Figure 12B:
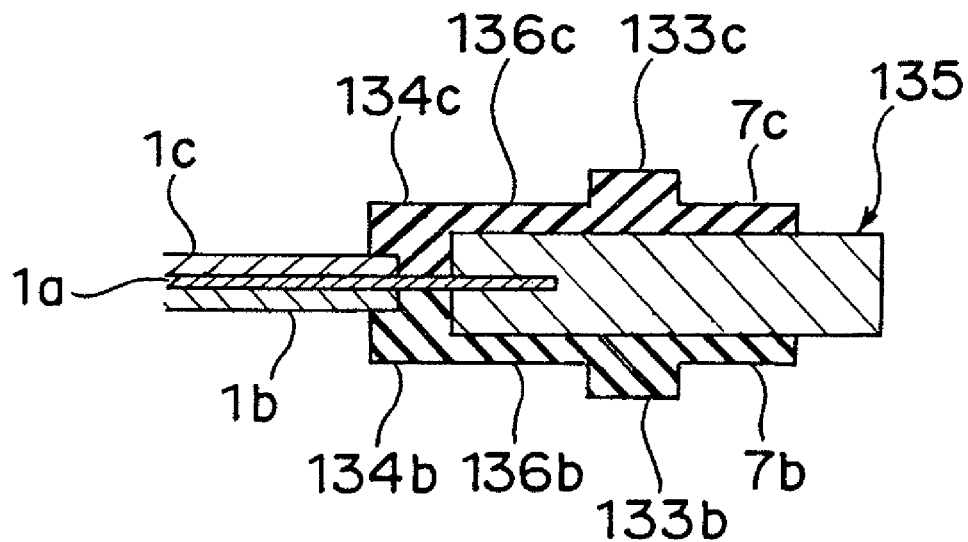
FIG. 12B is a schematic sectional view showing a method for forming the elastic member of a MEA-frame assembly according to a sixth embodiment by injection molding.

Next, a method for producing a MEA-frame assembly with which a fuel cell is provided according to a six embodiment of the present invention will be described with reference to schematic explanatory views of FIGS. 12A and 12B.

In each of the above embodiments, the case where the elastic members are formed integrally simultaneously on each surface of the anode side and the cathode side of the MEA-frame assembly by injection molding is described. However, the present invention is not only limited to such a case. Specifically, as shown in FIG. 12A, an elastic resin is injected from the gate 7c by injection molding on one surface, for example, cathode side surface 9a, of the MEA-frame assembly 135 to thereby form the cathode side outer elastic member 133c, each of the connecting elastic members 136c and the inner elastic member 134c. Thereafter, as shown in FIG. 12B, an elastic resin is newly injected from the gate 7b by injection molding on the other surface, for example, anode side surface 9b, of the MEA-frame assembly to thereby form the anode side outer elastic member 133b, each of the connecting elastic members 136b and the inner elastic member 134b.

In this manner, the elastic members can be formed separately on each surface of the MEA-frame assembly 135 by injection molding. Further, this formation method has an advantage that it is unnecessary to form a through-hole in the frame 2.

Here, in each of the above embodiments, the case where the elastic member is formed on each of the anode side and cathode side surfaces of the MEA-frame assembly is described as an example. However, the present invention may also be the case where the elastic member is formed on only one surface of the MEA-frame assembly 15, instead of the above case. Even in the case where the elastic member is arranged on only one surface, the effect of suppressing the cross-leak of gas can be obtained.

Working Example

Figure 13:
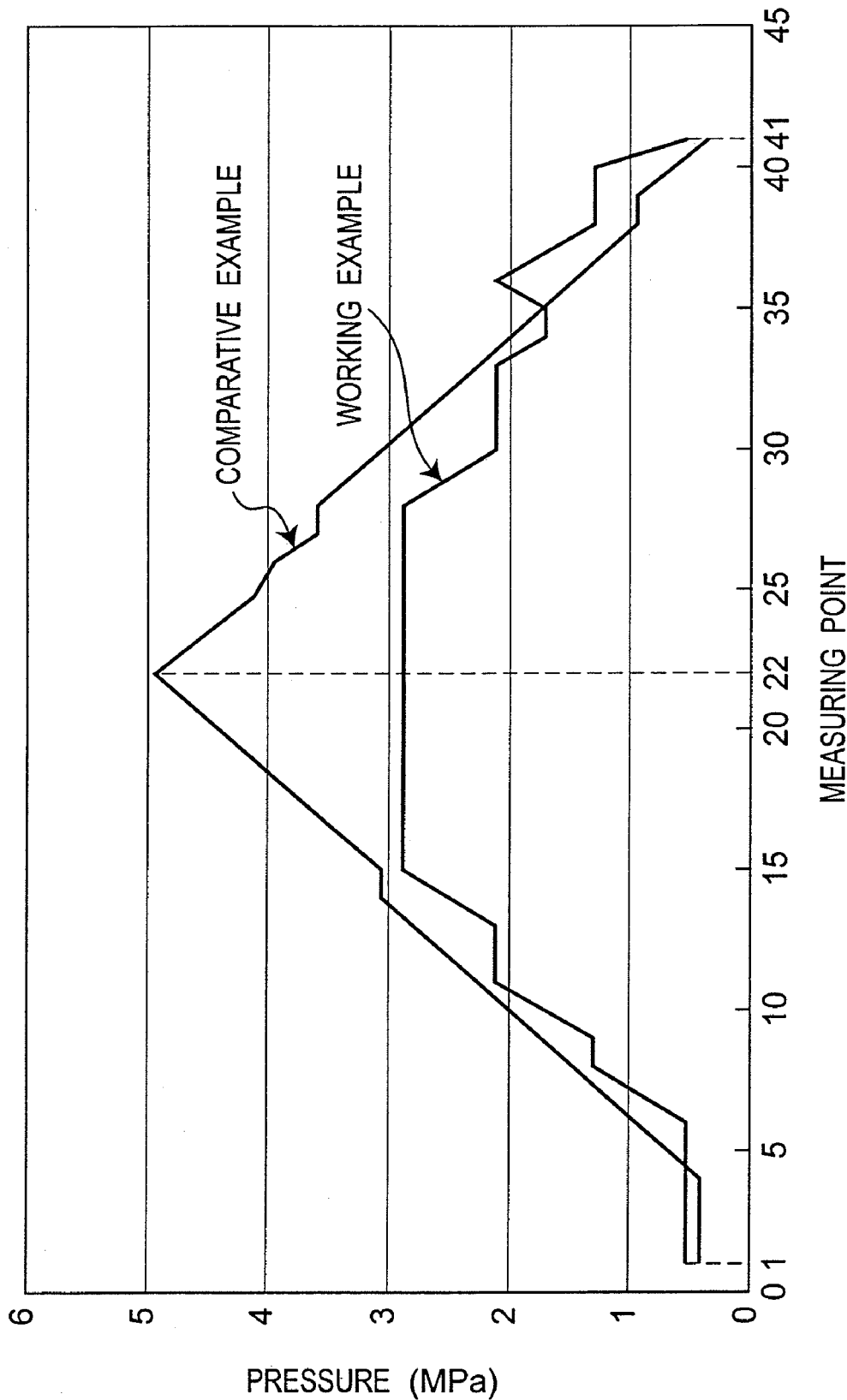
FIG. 13 is a graph showing the results obtained by measuring the distribution of pressure in a resin flow passage in an embodiment of the present invention.

Here, the graph of FIG. 13 shows the results obtained by measuring the distribution of pressure of the elastic resin in the second resin flow passage corresponding to the inner elastic member in the MEA-frame assembly 15 having the structure of the above first embodiment (Working Example) and the distribution of pressure in the resin flow passage provided with no connecting resin flow passage as the resin flow passage of the MEA-frame assembly according to Comparative Example.

In the graph showing the distribution of pressure in FIG. 13, the ordinate is the pressure (MPa) of the resin and the abscissa is the positions of measuring points. Here, the measuring point 22 is placed at a position closest to the gate which is the resin injection opening and measuring points closer to the measuring point 1 or measuring point 41 are more distant from the gate.

In the MEA-frame assembly of Comparative Example provided with no communicating resin flow passage, as shown in FIG. 13, the pressure of the resin reaches about 5 MPa at the measuring point 22. On the other hand, in the case of forming the communicating resin flow passage similar to the MEA-frame assembly 14 of Working Example, the upper limit of the pressure of the resin can be suppressed to about 2.9 MPa or less and it is found that the effect of the pressure uniformity is obtained.

Therefore, the structure of the MEA-frame assembly of each of the above embodiments ensures that the resin pressure uniformity in the flow passage and the time uniformity required to fill the resin into the flow passage can be made, and it is possible to form the inner elastic member by injection molding which suppresses the occurrence of cross-leak to achieve hermetic sealing at the junction between the electrode portion which is relatively reduced in thermal strength and the frame.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-091975 filed on Mar. 30, 2007, including specification, drawings and claims for patent, are incorporated herein by reference in its entirety.

The invention claimed is:

1. A polymer electrolyte fuel cell assembled by stacking a plurality of single cell modules, each of the single cell modules comprising:

a polymer electrolyte membrane electrode having a first surface and a second surface;

an anode electrode and a cathode electrode formed on the first and second surfaces of the electrolyte membrane electrode, respectively, each of the anode and cathode electrodes having an outer periphery;

a frame having an inner periphery, an inner side, and first and second separator-side surfaces, the frame sandwiching a part of the electrolyte membrane electrode;

a pair of separators which includes a first separator adjacent a surface of the anode electrode and a second separator adjacent a surface of the cathode electrode such that the pair of separators sandwich the anode electrode and the cathode electrode, the first and second separators being disposed adjacent the first and second separator-side surfaces, respectively, and the first and second separators having first and second concave parts, respectively;

an inner elastic member which is arranged on the inner periphery of the frame so as to extend along the outer periphery of both the anode and cathode electrodes, each of the anode and cathode electrodes being formed at the inner side of the frame;

first and second outer elastic members which are arranged so as to extend along the inner elastic member on the first and second separator-side surfaces of the frame; and a plurality of connecting elastic members, the plurality of connecting elastic members including first and second elastic members arranged on the frame and connecting the inner elastic member with the first and second outer elastic members, respectively, wherein the inner elastic member protrudes a predetermined distance beyond each of the first and second separator-side surfaces of the frame, each of the first and second outer elastic members is disposed so as to face the first and second concave parts, respectively, and in the assembled state, the inner elastic member and the first and second outer elastic members are elastically deformed thereby sealing a space between the separators, and the anode and cathode electrodes, the electrolyte membrane electrode and the frame.

2. The polymer electrolyte fuel cell as defined in claim 1, further comprising:

a pump for supplying cooling water to be circulated into the fuel cell;

a heat exchanger for exchanging the heat removed by the cooling water with a fluid; and a warm-water tank for reserving the fluid.

3. The polymer electrolyte fuel cells as defined in claim 2, further comprising:

an operation control device for performing a control operation for the fuel cell; and a power output unit for drawing the power generated by the fuel cell.

* * * * *

UNITED STATES PATENT AND TRADEMARK OFFICE
CERTIFICATE OF CORRECTION

| | | |
|---|---|---|
| PATENT NO. | : 7,790,329 B2 | Page 1 of 1 |
| APPLICATION NO. | : 12/469995 | |
| DATED | : September 7, 2010 | |
| INVENTOR(S) | : Takashi Morimoto et al. | |

It is certified that error appears in the above-identified patent and that said Letters Patent is hereby corrected as shown below:

IN THE CLAIMS, in column 20, claim 3, line 21, "cells" should read --cell--.

Signed and Sealed this
Eighth Day of March, 2011

David J. Kappos
*Director of the United States Patent and Trademark Office*